(12) United States Patent  (10) Patent No.: US 6,694,079 B1
Matsuo et al.  (45) Date of Patent: Feb. 17, 2004

(54) DISPERSON-SHIFTED OPTICAL FIBER EMPLOYING DUAL SHAPE CORE PROFILE

(75) Inventors: Shoichiro Matsuo, Sakura (JP); Hiroshi Kutami, Sakura (JP); Shoji Tanigawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 297 days.

(21) Appl. No.: 09/787,780

(22) PCT Filed: Jul. 27, 2000

(86) PCT No.: PCT/JP00/05023

§ 371 (c)(1),
(2), (4) Date: Mar. 21, 2001

(87) PCT Pub. No.: WO01/07943

PCT Pub. Date: Feb. 1, 2001

(30) Foreign Application Priority Data

| Jul. 27, 1999 | (JP) | 11-212949 |
| Aug. 16, 1999 | (JP) | 11-230137 |
| Mar. 8, 2000 | (JP) | 2000-064008 |
| Jul. 25, 2000 | (JP) | 2000-224491 |
| Jul. 25, 2000 | (JP) | 2000-224492 |

(51) Int. Cl.$^7$ .............................. G02B 6/22; G02B 6/16
(52) U.S. Cl. ........................................ 385/123; 385/126
(58) Field of Search .................. 385/123, 124, 385/125, 126, 127, 128

(56) References Cited

U.S. PATENT DOCUMENTS

| 5,559,921 A | 9/1996 | Terasawa et al. |
| 5,659,649 A | 8/1997 | Nouchi et al. |
| 5,675,688 A | 10/1997 | Nouchi et al. |
| 5,684,909 A | 11/1997 | Liu |
| 5,715,346 A | 2/1998 | Liu |
| 5,852,701 A | 12/1998 | Kato et al. |
| 5,963,700 A | 10/1999 | Kato et al. |
| 6,072,929 A | 6/2000 | Kato et al. |
| 6,084,993 A | 7/2000 | Mukasa |

FOREIGN PATENT DOCUMENTS

| AU | 718167 | 6/1999 |
| CA | 2225889 | 6/1998 |
| CA | 2229280 | 8/1998 |
| CA | 2246473 | 3/1999 |

(List continued on next page.)

OTHER PUBLICATIONS

Bhagavatula, V.A. et al., "Dispersion–shifted single–mode fiber for high–bit–rate and multiwavelength systems," OFC '95 Techincal Digest, (1995), pp. 259–260.

(List continued on next page.)

Primary Examiner—Walter E. Snow
(74) Attorney, Agent, or Firm—Bell, Boyd & Lloyd LLC

(57) ABSTRACT

A dispersion-shifted optical fiber is obtained that has a refractive index distribution shape comprising a center core portion of high refractive index, a step core portion of lower refractive index than the center core portion, provided about the outer circumference thereof, and clad of lower refractive index than the step core portion, provided about the outer circumference of the step core, in which, by suitably setting structural parameters, both Aeff expansion and dispersion slope reduction are satisfactorily effected, simultaneously, under conditions that the optical fiber is substantially single-mode, and bending loss is held down to 100 dB/m or lower.

15 Claims, 12 Drawing Sheets

FOREIGN PATENT DOCUMENTS

| | | |
|---|---|---|
| CN | 1186250 A | 7/1998 |
| EP | 0 689 068 A1 | 12/1995 |
| EP | 0 749 024 A2 | 12/1996 |
| EP | 0 779 524 A2 | 6/1997 |
| EP | 0 789 257 A1 | 8/1997 |
| EP | 0 851 245 A2 | 7/1998 |
| EP | 0 859 247 A2 | 8/1998 |
| EP | 0 862 069 A2 | 9/1998 |
| EP | 0 959 374 A1 | 11/1999 |
| FR | 2 768 233 | 3/1999 |
| GB | 2 331 162 A | 5/1999 |
| JP | 1-169410 | 7/1989 |
| JP | 1-224706 | 9/1989 |
| JP | 6-11620 | 1/1994 |
| JP | 8-5855 | 1/1996 |
| JP | 8-160241 | 6/1996 |
| JP | 8-220362 | 8/1996 |
| JP | 9-218318 | 8/1997 |
| JP | 9-274118 | 10/1997 |
| JP | 9-281354 | 10/1997 |
| JP | 9-288220 | 11/1997 |
| JP | 10-062640 | 3/1998 |
| JP | 10-239550 | 9/1998 |
| JP | 10-246830 | 9/1998 |
| JP | 10-293225 | 11/1998 |
| JP | 10-300966 | 11/1998 |
| JP | 11-72640 | 3/1999 |
| JP | 11-84158 | 3/1999 |
| JP | 11-119045 | 4/1999 |
| JP | 11-119046 | 4/1999 |
| JP | 11-167038 | 6/1999 |
| JP | 11-506228 | 6/1999 |
| JP | 11-218633 | 8/1999 |
| JP | 11-223741 | 8/1999 |
| JP | 2000-221352 | 8/2000 |
| WO | WO 96/07942 | 3/1996 |
| WO | WO 97/33188 | 9/1997 |
| WO | WO99/30193 | 6/1999 |
| WO | WO00/31573 | 6/2000 |
| WO | WO00/52507 | 9/2000 |

OTHER PUBLICATIONS

Nouchi, P. et al., "New Dispersion Shifted Fiber With Effective Area Larger Than 90$\mu m^2$," 2nd European Conference on Optical Communication, Sep. 15–19, 1996, MoB.3.2, pp. 1.49–1.52.

Himeno, K. et al., "Splice Loss of Large Effective Area Fiber and Its Reduction by Mode Field Conversion," ECOC 97, Sep. 22–25, 1997, Conference Publication No. 448, pp. 131–134.

Nouchi, P., "Maximum effective area for non–zero dispersion–shifted fiber," OFC '98 Technical Digest, pp. 303–304.

Hirano, M. et al., "Ring–Core Type Dispersion Shifted Fiber with Low Dispersion Slope," Proceedings of the 1998 IEICE General Conferecne, Mar. 27–30, 1998,—223 (no translation).

Liu, Y. et al., "Single–Mode Dispersion–Shifted Fibers with Effective Area Over 100$\mu m^2$," ECOC '98, Sep. 20–24, 1998, p. 41–42.

Belov, A.V., "Profiles structure of single–mode fibers with low nonlinear properties for long–haul communications lines," Optics Communications, 161 (1999) pp. 212–216.

Kato, T. et al., "Low nonlinearity dispersion–shifted fibers employing dual–shaped core profile with depressed cladding," OFC '97 Technical Digest, p. 66.

Namihara, Y. et al., 637 Large Effective Area Dispersion Shifted Fibers with Depressed Cladding for WDM Transmission,638 APCC/OECC '99 Conference, Oct. 18–22, 1999, pp. 1557–1580.

Namihira, Y. et al., "Low Nonlinear Optical Fibers for WDM Transmission," Technical research report of the Institute of Electronics, Information and Communication Engineers, May 1999, vol. 99, No. 90 (OCS99–19), pp. 61–66 (abstract only).

Kato, T. et al., "Dispersion Shifted Fiber for WDM Transmission," Technical research report of the Institute of Electronics, Information and Communication Engineers, Nov. 1996, vol. 96, No. 339 (OCS96–58), pp. 43–48 (abstract only).

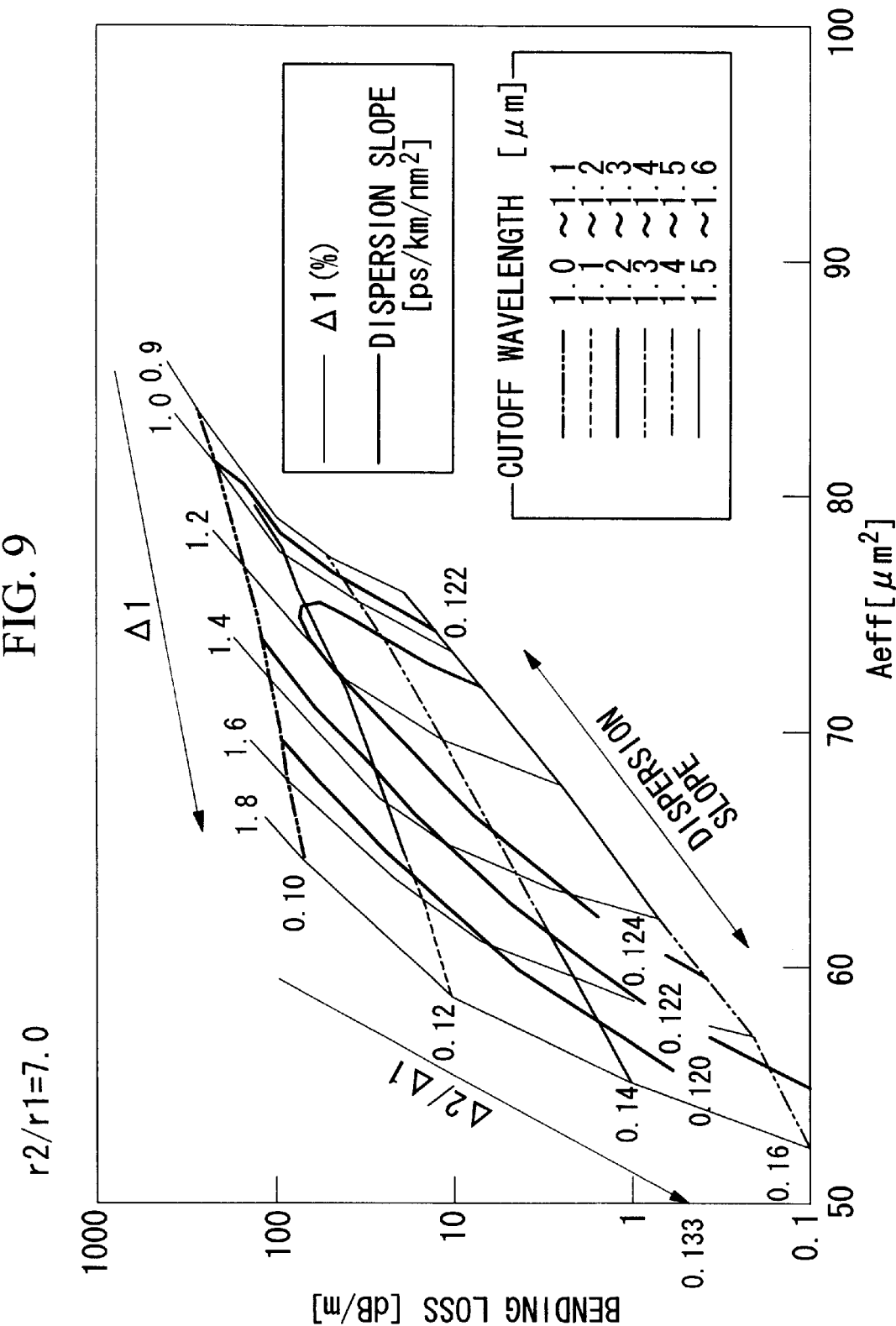

DISPERSON-SHIFTED OPTICAL FIBER EMPLOYING DUAL SHAPE CORE PROFILE

TECHNICAL FIELD

This invention relates to dispersion-shifted optical fiber having large effective core area and low dispersion slope.

The present invention is based on patent applications filed in Japan (Japanese Patent Application No. H11-212949/1999, Japanese Patent Application No. H11-230137/1999, Japanese Patent Application No. 2000-64008, Japanese Patent Application No. 2000-224491, and Japanese Patent Application No. 2000-224492), and the particulars described in those Japanese patent applications are incorporated as part of this specification.

BACKGROUND ART

In a long-haul system such as an optical amplifier repeater transmission system employing optical fiber amplifiers, it is important that the nonlinear optical effects be reduced. A parameter called the nonlinear optical coefficient is a parameter that serves as an index to the degree of nonlinear optical effect. The nonlinear optical coefficient is expressed by n2/Aeff, where n2 is the nonlinear refractive index and Aeff is the effective core area. The value of n2 becomes roughly constant depending on the material, and expanding the Aeff is an effective technique for reducing nonlinear optical effects.

In wavelength division multiplexed transmission systems which can handle high-volume transmission, on the other hand, there is a need to suppress the chromatic dispersion value and reduce dispersion slope. It is well known that, in a wavelength division multiplexed transmission system, when a zero-dispersion wavelength exists in the transmission bandwidth, transmission quality declines due to a nonlinear optical effect called four-wave mixing. However, because large chromatic dispersion values are accompanied by signal waveform deterioration, it is necessary to suppress that value to a certain size. In order to satisfy these conflicting demands, optical fiber called non-zero dispersion-shifted optical fiber in which the chromatic dispersion value in the wavelength band used is controlled to within a narrow range has been developed.

In a wavelength division multiplexed transmission system, furthermore, reducing the dispersion slope is also important. By dispersion slope, which indicates the wavelength dependency of the chromatic dispersion value, is meant the slope of the curve obtained by plotting wavelength (nm) on the horizontal axis and chromatic dispersion value (ps/km·nm) on the vertical axis. In a wavelength division multiplexed transmission system, if the dispersion slope of the transmission line (optical fiber) is large, the difference in chromatic dispersion value between wavelengths will be great. For that reason, by taking a very large dispersion value, depending on the wavelength, difficulties are encountered such as the transmission quality being greatly different between different channels. Accordingly, there is a need to make the dispersion slope smaller.

The specific values for the characteristics demanded in the Aeff and dispersion discussed above will be different according to the system employed. In a system in which transmissions are made over very long haul, such as submarine systems, a reduction in nonlinear optical effect resulting from Aeff expansion is sought. In a system extending for from several tens to several hundreds of km, on the other hand, there is sometimes a need to suppress the dispersion value in a wide wavelength band by dispersion slope reduction. In terms of the minimum conditions demanded for the transmission line in a light communication system, furthermore, the optical fiber should be substantially single-mode, and the bending loss should be held down to 100 dB/m or lower.

That being so, proposals have recently been made on ways to effect some degree of Aeff expansion and dispersion slope decrease using various refractive index distribution shapes (refractive index profiles), as in Japanese Patent Application Laid-Open No. H10-62640/1998, Japanese Patent Application Laid-Open No. H10-293225/1998, Japanese Patent Application Laid-Open No. H8-220362/1996, and Japanese Patent Application Laid-Open No. H10-246830/1998, for example.

In FIGS. 10A to 10C are diagrammed examples of shapes of refractive index distribution of such dispersion-shifted optical fiber.

In FIG. 10A is represented one example of a dual shape core (step) type of refractive index distribution, in a core 14 is formed, with the symbol 11 designating the center core portion and a step core portion 12 provided about the outer circumference thereof having a lower refractive index than the center core portion 11. Furthermore, about the outer circumference of that core 14, clad 17 is provided having a lower refractive index than the step core portion 12.

In Japanese Patent Application Laid-Open No. H8-220362/1996, the present applicant disclosed the use of the smaller diameter solution, for the purpose of expansion of Aeff, in dispersion-shifted optical fiber having a dual shape core type refractive index distribution.

It has been known for some time that, when the core diameter of a dispersion-shifted optical fiber is expanded while maintaining the similarity of refractive index distribution shape, two or more solutions exist wherewith the chromatic dispersion value becomes the desired value. At such time, of the solutions within a range wherein the bending loss and cutoff wavelength characteristics are comparatively practical, the solution wherewith the core diameter is relatively thin is called the smaller diameter solution, and the solution wherewith the core diameter is relatively large is called the larger diameter solution.

In FIG. 10B is represented an example of a segmented core type of refractive index distribution shape, wherein a core 24 is configured with an intermediate portion 22 of low refractive index provided about the outer circumference of the center core portion 21 of high refractive index, and a ring core portion 23 having a higher refractive index than the intermediate portion 22 but a lower refractive index than the center core portion 21 provided about the outer circumference of that intermediate part 22. Also, about the outer circumference of that ring core portion 23 is provided a first clad 25 having a lower refractive index than the intermediate portion 22, and about the outer circumference of that first clad 25 is provided a second clad 26 having a higher refractive index than the first clad 25 but a lower refractive index than the intermediate portion 22, thus configuring clad 27.

In Japanese Patent Application Laid-Open No. H11-119045/1999 (published), furthermore, the present applicant disclosed a dispersion-shifted optical fiber well suited to optical communication systems wherein the reduction of the dispersion slope is more rigorously demanded than the expansion of the Aeff, by using the larger diameter solution in a segmented core type of refractive index distribution shape.

In FIG. 10C is represented an example of an O ring type refractive index distribution shape, wherein a core 34 is configured with a two-layer structure, with a peripheral core portion 32 of high refractive index provided about the outer circumference of a center core portion 31 of low refractive index at the center. About the outer circumference of that core 34 is provided clad 37 of lower refractive index than the peripheral core portion 32, thereby configuring a three-layer structure convex type refractive index distribution shape inclusive of the clad 37.

In the dispersion-shifted optical fibers conventionally proposed, however, under such conditions as that they are substantially single-mode and that the bending loss is held down to 100 dB/m or lower, it is very difficult to sufficiently realize both Aeff expansion and dispersion slope reduction simultaneously.

Looking at the dual shape core type of optical fiber wherein the smaller diameter solution is used disclosed in Japanese Patent Application Laid-Open No. H8-220362/1996, for example, the dispersion slope is in the neighborhood of 0.10 ps/km/nm$^2$ at minimum, wherefore this optical fiber is sometimes inadequate for use in systems where dispersion slope reduction is rigorously demanded.

With the segmented core type optical fiber wherewith the larger diameter solution is used, disclosed in Japanese Patent Application Laid-Open No. H11-119045/1999, characteristics close to those demanded in somewhat more recent wavelength division multiplexed transmission systems are obtained. However, because the refractive index distribution shape comprises a five-layer structure wherein the refractive index increases and declines, the characteristics vary subtly depending on the position, width, and shape, etc., of each layer. Accordingly, during manufacture, a high level of controllability is demanded for such structural parameters as the radius and relative refractive-index difference of each layer. As a consequence, there is a limit to the degree to which product yield can be improved.

With the increase in the number of channels (i.e. number of multiplexed wavelengths), moreover, dispersion-shifted optical fiber has come to be demanded which can be employed all across a wide transmission wavelength band of 1490 to 1625 nm in which the so-called L band (1570 to 1610 nm) has been added.

Conventional dispersion-shifted optical fiber of expanded Aeff is designed with transmission in the 1550 nm band in view, wherefore such optical fiber having adequate characteristics in the L band has not been provided. In many cases, bending loss became large particularly in the L band.

An object of the present invention, which was devised in view of the circumstances described above, is to provide dispersion-shifted optical fiber wherewith Aeff expansion and dispersion slope reduction can both be satisfactorily realized, simultaneously, under conditions such that a single-mode is substantially realized and the bending loss is held to 100 dB/m or less.

Another object is to provide dispersion-shifted optical fiber wherewith stabilized characteristics are exhibited with a structure made as simple as possible, that can nevertheless be efficiently manufactured.

Another object is to provide dispersion-shifted optical fiber wherewith Aeff expansion and dispersion slope reduction can both be satisfactorily realized, simultaneously, under conditions such that a single-mode is substantially realized and the bending loss is held to 100 dB/m or less, even in a broad wavelength band to which the L band has been added, covering from 1490 to 1625 nm.

Another object is to provide dispersion-shifted optical fiber that exhibits low bending loss, particularly in the L band.

DISCLOSURE OF THE INVENTION

In order to realize the objects stated above, a first dispersion-shifted optical fiber of the present invention is dispersion-shifted optical fiber having a refractive index distribution shape comprising a center core portion of high refractive index, a step core portion of lower refractive index than the center core portion, provided about the outer circumference thereof, and clad of lower refractive index than the step core portion, provided about the outer circumference of the step core portion, in which, the dispersion-shifted optical fiber has, in a used wavelength band selected from 1490 to 1625 nm, Aeff of 45 to 90 $\mu$m$^2$, dispersion slope of from 0.05 to 0.14 ps/km/nm$^2$, bending loss of 100 dB/m or less, and chromatic dispersion value of either from $-0.5$ to $-8.0$ ps/km/nm or from $+0.05$ to $+10.0$ ps/km/nm, and has a cutoff wavelength such that substantially single-mode propagation is realized.

A second dispersion-shifted optical fiber is characterized in that, in the first dispersion-shifted optical fiber, larger diameter solution is adopted for core diameter, and the dispersion-shifted optical fiber has, in a used wavelength band selected from 1490 to 1625 nm, Aeff of 45 to 70 $\mu$m$^2$, dispersion slope of from 0.05 to 0.08 ps/km/nm$^2$, bending loss of 100 dB/m or less, and chromatic dispersion value of from $-0.5$ to $-8.0$ ps/km/nm, and has a cutoff wavelength such that substantially single-mode propagation is realized.

A third dispersion-shifted optical fiber is characterized in that, in the second dispersion-shifted optical fiber, when radius of the center core portion is represented as r1, radius of the step core portion as r2, relative refractive-index difference of the center core portion when refractive index of outermost clad is taken as reference as $\Delta 1$, and relative refractive-index difference of the step core portion as $\Delta 2$, r2/r1 is from 4 to 12, $\Delta 2/\Delta 1$ is from 0.05 to 0.15, and $\Delta 1$ is from 0.55 to 0.85%.

A fourth dispersion-shifted optical fiber is characterized in that, in the second dispersion-shifted optical fiber, the clad comprises first clad provided about outer circumference of said step core portion and second clad having a higher refractive index than the first clad, provided about outer circumference of the first clad.

A fifth dispersion-shifted optical fiber is characterized in that, in the fourth dispersion-shifted optical fiber, when radius of the center core portion is represented as r1, radius of the step core portion as r2, radius of the first clad as r3, relative refractive-index difference of the center core portion when refractive index of the outermost clad is taken as reference as $\Delta 1$, relative refractive-index difference of the step core portion as $\Delta 2$, and relative refractive-index difference of the first clad as $\Delta 3$, r2/r1 is from 4 to 12, $\Delta 2/\Delta 1$ is from 0.05 to 0.15, $\Delta 1$ is from 0.55 to 0.85%, $\Delta 3$ is from $-0.3$ to 0%, and (r3$-$r2)/r1 is from 0.2 to 4.0.

A sixth dispersion-shifted optical fiber is characterized in that, in the first dispersion-shifted optical fiber, larger diameter solution is adopted for core diameter, and the dispersion-shifted optical fiber has, in a used wavelength band selected from 1490 to 1625 nm, Aeff of 45 to 70 $\mu$m$^2$, dispersion slope of from 0.05 to 0.075 ps/km/nm$^2$; bending loss of 100 dB/m or less, and chromatic dispersion value of from $+0.05$ to $+10.0$ ps/km/nm, and has a cutoff wavelength such that substantially single-mode propagation is realized.

A seventh dispersion-shifted optical fiber is characterized in that, in the sixth dispersion-shifted optical fiber, when radius of the center core portion is represented as r1, radius of the step core portion as r2, relative refractive-index difference of the center core portion when refractive index of the outermost clad is taken as reference as Δ1, and relative refractive-index difference of the step core portion as Δ2, r2/r1 is from 4 to 12, Δ1 is from 0.55 to 0.75%, and Δ2/Δ1 is from 0.05 to 0.15.

An eighth dispersion-shifted optical fiber is characterized in that, in the sixth dispersion-shifted optical fiber, the clad comprises first clad provided about outer circumference of the step core portion and second clad provided about outer circumference thereof.

A ninth dispersion-shifted optical fiber is characterized in that, in the eighth dispersion-shifted optical fiber, when radius of the center core portion is represented as r1, radius of the step core portion as r2, radius of the first clad as r3, relative refractive-index difference of the center core portion when refractive index of the second clad is taken as reference as Δ1, relative refractive-index difference of the step core portion as Δ2, and relative refractive-index difference of the first clad as Δ3, r2/r1 is from 4 to 12, Δ1 is from 0.55 to 0.75%, Δ2/Δ1 is from 0.05 to 0.15, Δ3 is from −0.1 to 0%, and (r3−r2)/r1 is from 0.2 to 4.0.

A tenth dispersion-shifted optical fiber is characterized in that, in the first dispersion-shifted optical fiber, smaller diameter solution is adopted for the core diameter, and the dispersion-shifted optical fiber has, in a used wavelength band selected from 1490 to 1625 nm, Aeff of 65 to 95 $\mu m^2$, dispersion slope of from 0.08 to 0.14 ps/km/nm², bending loss of 100 dB/m or less, and the absolute values of the chromatic dispersion value of from 0.5 to 8.0 ps/km/nm, and has a cutoff wavelength such that substantially single-mode propagation is realized.

An 11th dispersion-shifted optical fiber is characterized in that, in the tenth dispersion-shifted optical fiber, when radius of the center core portion is represented as r1, radius of the step core portion as r2, relative refractive-index difference of the center core portion when refractive index of the clad is taken as reference as Δ1, relative refractive-index difference of the step core portion as Δ2, r2/r1 as x, and Δ2/Δ1 as y, 5≦x≦10, 0.08≦y≦0.22, and 0.6%≦Δ1≦1.2%.

A 12th dispersion-shifted optical fiber is the tenth dispersion-shifted optical fiber having a zero dispersion wavelength on the side of longer wavelengths than the wavelength band used.

A 13th dispersion-shifted optical fiber is characterized in that, in the 12th dispersion-shifted optical fiber, when radius of the center core portion is represented as r1, radius of the step core portion as r2, relative refractive-index difference of the center core portion when refractive index of the clad is taken as reference as Δ1, relative refractive-index difference of the step core portion as Δ2, r2/r1 as x, and Δ2/Δ1 as y, 6≦x≦7, 0.1≦y≦0.18, y≧(−0.02x+0.24), 0.6%≦Δ1≦1.2%, Aeff is from 65 to 75 $\mu m^2$, and dispersion slope is 0.125 ps/km/nm² or less.

A 14th dispersion-shifted optical fiber is characterized in that, in the 12th dispersion-shifted optical fiber, 7≦x≦8, 0.1≦y≦0.16, y≧(−0.016x +0.21), 0.6%≦Δ1≦1.2%, Aeff is from 70 to 80 $\mu m^2$, and dispersion slope is 0.130 ps/km/nm² or less.

A 15th dispersion-shifted optical fiber is characterized in that, in the 12th dispersion-shifted optical fiber, 7≦x≦8.5, 0.1≦y≦0.16, (−0.02x+0.26)≦y≦(−0.02x+0.32), 0.6%≦Δ1≦1.2%, Aeff is from 75 to 85 $\mu m^2$, and dispersion slope is 0.135 ps/km/nm² or less.

A 16th dispersion-shifted optical fiber is the tenth dispersion-shifted optical fiber having a zero dispersion wavelength on the side of shorter wavelength than the wavelength band used.

A 17th dispersion-shifted optical fiber is characterized in that, in the 16th dispersion-shifted optical fiber, when radius of the center core portion is represented as r1, radius of the step core portion as r2, relative refractive-index difference of the center core portion when refractive index of the clad is taken as reference as Δ1, relative refractive-index difference of the step core portion as Δ2, r2/r1 as x, and Δ2/Δ1 as y, 5≦x≦8, 0.12≦y≦0.22, (−0.02x+0.24)≦y≦(−0.02x+0.34), 0.6%≦Δ1≦1.2%, Aeff is from 65 to 75 m², and dispersion slope is 0.110 ps/km/nm² or less.

An 18th dispersion-shifted optical fiber is characterized in that, in the 16th dispersion-shifted optical fiber, 5.5≦x≦8, 0.12≦y≦0.20, (−0.02x+0.25)≦y≦(−0.02x+0.33), 0.6%≦≦Δ1≦1.2%, Aeff is from 70 to 80 $\mu m^2$, and dispersion slope is 0.115 ps/km/nm² or less.

A 19th dispersion-shifted optical fiber is characterized in that, in the 16th dispersion-shifted optical fiber, 6≦x≦8, 0.12≦y≦0.20, (−0.02x+0.26)≦y≦(−0.02x+0.35), 0.6%≦Δ1≦1.2%, Aeff is from 75 to 85 $\mu m^2$, and dispersion slope is 0.125 ps/km/nm² or less.

BRIEF DESCRIPTION OF THE DRAWINGS

FIG. 9 is a graph representing distributions of characteristic values associated with changes in Δ2/Δ1 and Δ1 when r2/r1 is 9.0 in the third embodiment;

BEST MODE FOR CARRYING OUT THE INVENTION

The dispersion-shifted optical fiber of the present invention has a refractive index distribution shape comprising a center core portion of high refractive index, a step core portion of lower refractive index than the center core portion, provided about the outer circumference of the center core portion, and clad of lower refractive index than the step core portion, provided about the outer circumference of the step core portion.

By adjusting the structural parameters, moreover, a dispersion-shifted optical fiber is obtained wherein, in an used wavelength band selected from a range of 1490 to 1625 nm, the Aeff is 45 to 90 $\mu m^2$, the dispersion slope from 0.05 to 0.14 ps/km/nm$^2$, the bending loss 100 dB/m or less, and the chromatic dispersion value either from −0.5 to −8.0 ps/km/nm or from 0.05 to 10.0 ps/km/nm, which has a cutoff wavelength such that substantially single-mode propagation is realized.

The present invention is now described in detail in terms of first, second, and third embodiments.

First Embodiment

Figure 1A:
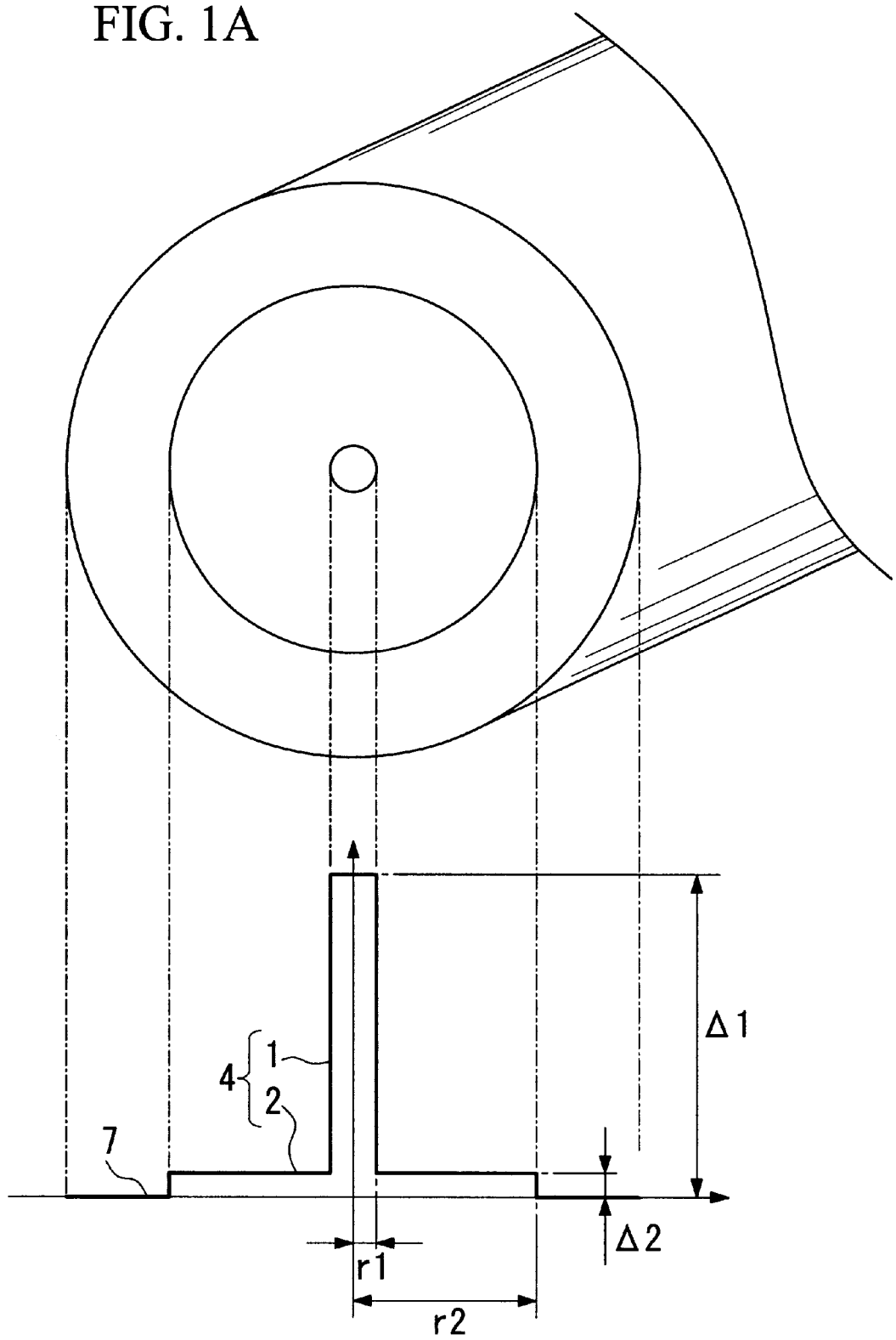
FIG. 1A is a diagram of a first example of a refractive index distribution shape for a dispersion-shifted optical fiber of the present invention.

FIG. 1A represents a first example of a refractive index distribution shape for a dispersion-shifted optical fiber in this first embodiment.

This refractive index distribution shape is configured by a core 4 wherein a step core portion 2 is provided about the outer circumference of a center core portion 1, and clad 7 of a single layer structure having a uniform refractive index, provided about the outer circumference of the core 4.

The center core portion 1 has the highest refractive index, the step core portion 2 has a refractive index lower than that of the center core portion 1, and the clad 7 has a refractive index lower than that of the step core portion 2.

The symbols r1 and r2 in figure, respectively, indicate the radiuses of the center core portion 1 and the step core portion 2, while Δ1 and Δ2, respectively, indicate the relative refractive-index difference of the center core portion 1 and the relative refractive-index difference of the step core portion 2 when the refractive index of the clad 7 is used as a reference.

In this example, the center core portion 1 and the step core portion 2 are configured by germanium-doped quartz glass to which has been added germanium which exhibits an effect to raise the refractive index, while the clad 7 is configured by pure quartz glass.

In the refractive index distribution shape of the dispersion-shifted optical fiber, furthermore, the boundary between each layer (i.e. the center core portion 1, step core portion 2, and clad 7) need not be definite, as diagrammed in FIG. 1A, but may instead be in a rounded condition exhibiting so-called sagging, and need not be particularly limited so long as the characteristics of the dispersion-shifted optical fiber of this embodiment are effectively exhibited.

In the dispersion-shifted optical fiber of this embodiment, a wavelength range extending from 1490 to 1625 nm, and generally from 1490 to 1610 nm, is made the main wavelength band for use, and a wavelength band having a suitable wavelength width is selected from these ranges when determining the embodiment specifications. These wavelength bands are largely classified into three wavelength bands according to the amplification wavelength band based on the optical fiber amplifiers used in the light communication system. More specifically, it is common to designate the wavelength band extending from 1490 to 1530 nm as the S band, the wavelength band extending from 1530 to 1565 nm as the C band, and the wavelength band extending from 1565 to 1625, but generally from 1490 to 1610 nm, as the L band. The systems currently in use primarily employ the C band, but systems are being developed which presume the use of the L band in addition to the C band in order to respond to demands for bands exhibiting increased transmission volume.

The Aeff is found by the following formula.

$$Aeff = \frac{2\pi \left\{ \int_0^\infty a|E(a)|^2 \, da \right\}^2}{\int_0^\infty a|E(a)|^4 \, da}$$

where a is the core radius and E(a) is the electric field strength at the radius a.

In this embodiment, when the Aeff in the wavelength band used is less than 45 $\mu m^2$ the nonlinear optical effect is insufficiently suppressed. Dispersion-shifted optical fiber wherein the Aeff exceeds 70 $\mu m^2$ is very difficult to manufacture.

The smaller the value of the dispersion slope in the wavelength band used the better, as noted in the foregoing. In this embodiment, it is possible to realize very small values for the dispersion slope in the wavelength band used, namely from 0.05 to 0.08 ps/km/nm$^2$. When 0.08 ps/km/nm$^2$ is exceeded, the wavelength dependency of the chromatic dispersion value becomes great, which with this embodiment sometimes presents difficulties when applied in wavelength division multiplexed systems. At values less than 0.05 ps/km/nm$^2$, manufacture is very difficult.

By bending loss is meant a value occurring in the wavelength band used under the condition wherein the bend diameter (2R) is 20 mm.

The smaller the bending loss the better. In this embodiment, the bending loss is made 100 dB/m or less, and preferably 40 dB/m or less. When 100 dB/m is exceeded, transmission loss readily worsens due to slight bends imparted to the dispersion-shifted optical fiber, and unnecessary losses occur during laying operations or other handling, which is problematic.

In this embodiment, the chromatic dispersion value is made to be within a range of −0.5 to −8.0 ps/km/nm. When this value is larger than −0.5 ps/km/nm, the chromatic dispersion value approaches zero, and four-wave mixing, which is one nonlinear optical effect, readily occurs, which is problematic. When the value is smaller than −8.0 ps/km/nm, dispersion-induced waveform distortion occurs, and transmission characteristic deterioration becomes great, which is problematic. However, the range of dispersion values allowable in practice may vary depending on the relay distance and other system design factors.

Furthermore, because the dispersion-shifted optical fiber in this embodiment is a single-mode optical fiber, it is necessary to have a cutoff wavelength that substantially guarantees single-mode propagation in the wavelength band used.

Ordinary cutoff wavelengths are defined by values based on the CCITT's 2m method (hereinafter called the 2m method). However, in actual long-length use conditions, single-mode propagation is possible even when this value is on the longer wavelength side from the lower limiting value in the wavelength band used.

That being so, in the dispersion-shifted optical fiber of this embodiment, the cutoff wavelength defined by the 2m method is set so that single-mode propagation is possible according to the length of the dispersion-shifted optical fiber used and the wavelength band used. More specifically, if the cutoff wavelength in the 2m method is 1800 nm or less, under length conditions of about 5000 m or more, it is possible to effect single-mode propagation in the wavelength band used as described in the foregoing.

A configuration for satisfying such characteristics as these is described below, together with the research history thereof.

First, in this embodiment, the larger diameter solution is used as the core diameter, as described earlier. More specifically, in setting structural parameters that satisfy the numerical ranges for r2/r1, Δ2/Δ1, and Δ1, described below, using simulations, the settings are made so that the core diameter becomes the larger diameter solution, and design conditions are established which satisfy such characteristic values as Aeff, dispersion slope, and so on, in the wavelength band desired for use, as described in the foregoing. Furthermore, in terms of the actual method of manufacturing the dispersion-shifted optical fiber of this embodiment, a conventional method such as CVD, VAD, and so on, can be used.

Figure 2:
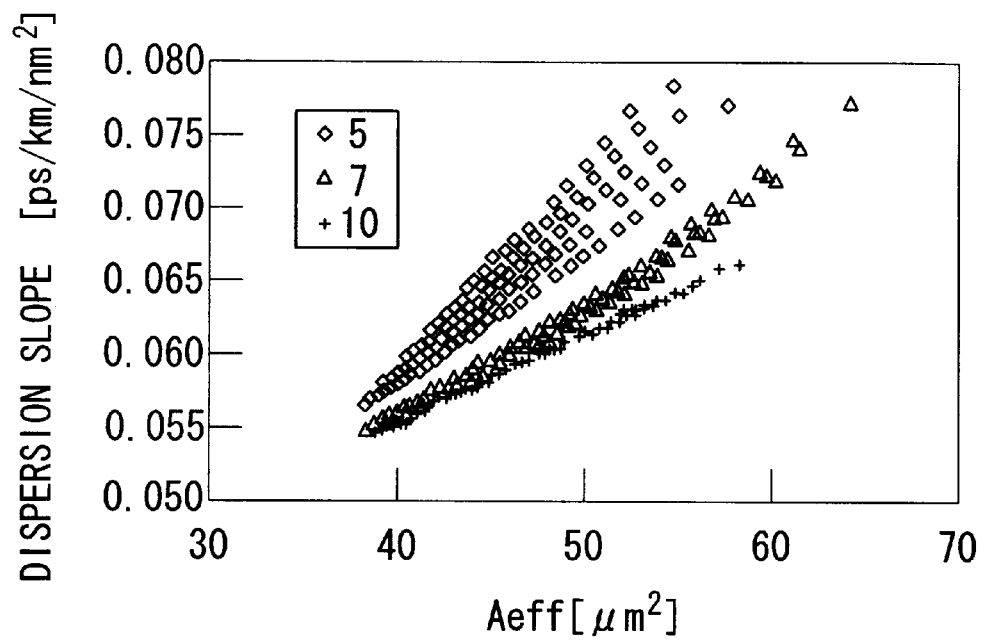
FIG. 2 is a graph representing an example analysis when the first example of the refractive index dispersion shape diagrammed in FIG. 1A is used in a first embodiment.

FIG. 2 is a graph representing an example of an analysis made when this first example refractive index distribution shape is used.

The values 5, 7, and 10 corresponding respectively to the symbols ◊, Δ, and + represented in the graph are values for r2/r1 (step magnification factor) that is the ratio between the radiuses of the center core portion 1 and the step core portion 2 diagrammed in FIG. 1A. Aeff is plotted on the horizontal axis and dispersion slope on the vertical axis, both of which are values for the wavelength 1550 nm.

From this graph it is seen that Aeff tends to expand as the value of r2/r1 increases, while the dispersion slope tends to become smaller. In order to satisfy the numerical value ranges for the chromatic dispersion value and bending loss noted earlier, it is preferable that r2/r1 be set at 4 times or greater. At less than 4 times, it becomes very difficult to realize characteristics that are better than those of conventional dispersion-shifted optical fiber. When 12 times is exceeded, productivity declines, which is problematic.

It is also desirable that Δ2/Δ1 be within a range of 0.05 to 0.15. At less than 0.05, bending loss becomes large, which is problematic. When 0.15 is exceeded, the cutoff wavelength becomes long, whereupon, in some cases, single-mode transmission cannot be sustained.

Δ1 is made to be within a range of 0.55 to 0.85%. When this value is less than 0.55%, it becomes very difficult to set the wavelength band used within the range of −0.5 to −8.0 ps/km/nm. When Δ1 is made large, it becomes possible to make the dispersion value small, but when 0.85% is exceeded, it becomes impossible to make Aeff sufficiently large, which is problematic.

Design is effected, making selections for the combinations of the numerical values from these numerical ranges for r2/r1, Δ2/Δ1, and Δ1, so as to satisfy the characteristics of the dispersion-shifted optical fiber of this embodiment.

In the dispersion-shifted optical fiber of this embodiment, furthermore, r2, that is, the core radius, is not limited particularly. Ordinarily this value will be in a range of 10 to 25 μm. The outer diameter of the clad 7 is ordinarily made approximately 125 μm.

In Table 1, specific design examples of dispersion-shifted optical fibers that satisfy such conditions as these are indicated. In this table, λcf represents the fiber cutoff wavelength based on the 2m method, λop the wavelength at which the characteristics are measured, and MFD the mode field diameter.

In each of these examples, characteristics are obtained which satisfy the preferred numerical ranges for Aeff, dispersion slope, chromatic dispersion value, bending loss, and cutoff wavelength, such as are suitable for a wavelength division multiplexed transmission system.

Figure 3:
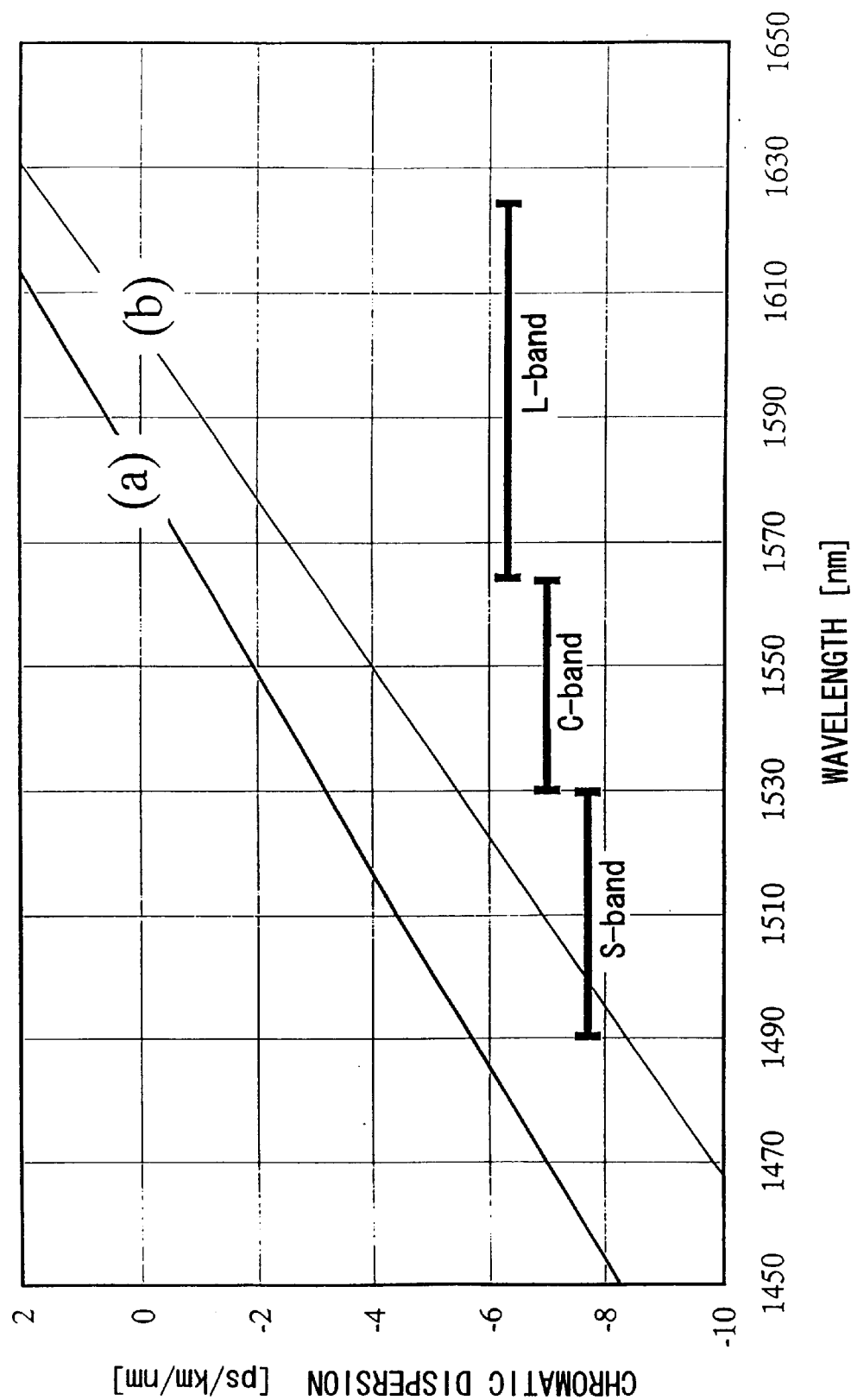
FIG. 3 is a graph representing an example of the dependency of chromatic dispersion values on wavelength for a dispersion-shifted optical fiber relating to the first embodiment.

The graph (a) given in FIG. 3 represents an example of the wavelength dependency of the chromatic dispersion value in the profile indicated in Table 1. The profiles indicated in Table 1 all have roughly similar wavelength dependency, taking dispersion values of −0.5 ps/km/nm or less in the region called the C-band up to the vicinity of 1570 nm, from which it can be seen that these are optical fibers suitable for a WDM (wavelength division multiplexing) transmission system wherein the C band is used.

When wavelength dependencies for the chromatic dispersion value as plotted in the graph (b) in FIG. 3 are taken, the range wherein chromatic dispersion values of −0.5 ps/km/nm or less can be taken can be expanded out to the vicinity of 1600 nm. That is, as compared to optical fibers having the characteristics represented by the graph (a) in FIG. 3, the optical fibers having the characteristics represented by the graph (b) in FIG. 3 make it possible to expand the range of wavelengths that can be used in a WDM transmission system. Profile design examples that effect the characteristics represented by the graph (b) in FIG. 3 are indicated in Table 2.

TABLE 1

| r2/r1 | Δ2/Δ1 | Δ1 [%] | 2 × r2 [μm] | λcf [nm] | λop [nm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|
| 8 | 0.08 | 0.635 | 35.23 | 1238 | 1490 | 44.63 | 7.76 | −5.69 | 0.064 | 4.0 |
|   |      |       |       |      | 1550 | 50.06 | 8.21 | −1.96 | 0.062 | 11.8 |
|   |      |       |       |      | 1625 | 58.13 | 8.83 | 2.71  | 0.062 | 35.5 |
| 5 | 0.10 | 0.660 | 21.27 | 1139 | 1490 | 44.64 | 7.76 | −6.18 | 0.071 | 1.4 |
|   |      |       |       |      | 1550 | 50.12 | 8.22 | −1.95 | 0.071 | 4.3 |
|   |      |       |       |      | 1625 | 58.09 | 8.83 | 3.33  | 0.071 | 13.5 |
| 10 | 0.06 | 0.620 | 44.01 | 995 | 1490 | 44.82 | 7.78 | −5.63 | 0.063 | 9.8 |
|   |      |       |       |      | 1550 | 50.31 | 8.23 | −1.89 | 0.062 | 26.9 |
|   |      |       |       |      | 1625 | 58.50 | 8.86 | 2.69  | 0.061 | 75.0 |
| 6 | 0.14 | 0.655 | 25.43 | 1563 | 1490 | 48.81 | 8.11 | −6.59 | 0.073 | 1.4 |
|   |      |       |       |      | 1550 | 55.30 | 8.62 | −2.20 | 0.073 | 4.2 |

TABLE 1-continued

| r2/r1 | Δ2/Δ1 | Δ1 [%] | 2 × r2 [μm] | λcf [nm] | λop [nm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|
| | | | | | 1625 | 64.81 | 9.30 | 3.33 | 0.074 | 12.6 |
| 8 | 0.10 | 0.615 | 34.81 | 1448 | 1490 | 48.97 | 8.12 | −6.48 | 0.067 | 10.2 |
| | | | | | 1550 | 55.47 | 8.63 | −2.50 | 0.060 | 26.5 |
| | | | | | 1625 | 65.22 | 9.33 | 2.46 | 0.066 | 69.5 |
| 10 | 0.08 | 0.600 | 43.58 | 1279 | 1490 | 49.12 | 8.14 | −5.81 | 0.066 | 26.3 |
| | | | | | 1550 | 55.67 | 8.65 | −1.90 | 0.065 | 64.5 |
| | | | | | 1625 | 65.56 | 9.35 | 2.92 | 0.064 | 159.0 |
| 6 | 0.12 | 0.630 | 24.99 | 1346 | 1490 | 51.23 | 8.30 | −7.20 | 0.076 | 7.1 |
| | | | | | 1550 | 58.39 | 8.84 | −2.64 | 0.076 | 17.7 |
| | | | | | 1625 | 68.93 | 9.57 | 3.10 | 0.077 | 44.4 |
| 7 | 0.12 | 0.620 | 29.93 | 1519 | 1490 | 51.09 | 8.29 | −6.24 | 0.071 | 7.8 |
| | | | | | 1550 | 58.16 | 8.83 | −1.98 | 0.071 | 19.9 |
| | | | | | 1625 | 68.72 | 9.56 | 3.39 | 0.072 | 51.0 |
| 10 | 0.10 | 0.600 | 43.37 | 1623 | 1490 | 51.16 | 8.30 | −6.11 | 0.067 | 34.4 |
| | | | | | 1550 | 58.23 | 8.84 | −2.12 | 0.066 | 83.0 |
| | | | | | 1625 | 68.96 | 9.58 | 2.83 | 0.066 | 202.0 |

TABLE 2

| r2/r1 | Δ2/Δ1 | Δ1 [%] | 2 × r2 [μm] | λcf [nm] | λop [nm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|
| 6.5 | 0.114 | 0.70 | 26.13 | 1425 | 1490 | 45.53 | 7.83 | −8.36 | 0.073 | 2.2 |
| | | | | | 1550 | 51.81 | 8.33 | −3.99 | 0.073 | 6.8 |
| | | | | | 1625 | 61.16 | 9.02 | 1.57 | 0.075 | 20.6 |
| 5.0 | 0.086 | 0.70 | 19.32 | 1004 | 1490 | 45.04 | 7.78 | −8.81 | 0.079 | 5.4 |
| | | | | | 1550 | 51.27 | 8.29 | −4.08 | 0.079 | 14.5 |
| | | | | | 1625 | 60.37 | 8.96 | 1.84 | 0.079 | 39.0 |
| 7.0 | 0.086 | 0.70 | 28.35 | 1223 | 1490 | 42.99 | 7.61 | −8.60 | 0.068 | 2.7 |
| | | | | | 1550 | 48.73 | 8.09 | −4.53 | 0.068 | 8.5 |
| | | | | | 1625 | 57.30 | 8.75 | 0.61 | 0.070 | 26.5 |
| 5.5 | 0.107 | 0.75 | 21.33 | 1234 | 1490 | 41.70 | 7.49 | −9.62 | 0.075 | 0.7 |
| | | | | | 1550 | 47.27 | 7.97 | −5.10 | 0.076 | 2.5 |
| | | | | | 1625 | 55.43 | 8.60 | 0.63 | 0.077 | 8.8 |
| 7.0 | 0.057 | 0.70 | 29.06 | 991 | 1490 | 40.06 | 7.35 | −7.67 | 0.064 | 1.8 |
| | | | | | 1550 | 44.96 | 7.78 | −3.89 | 0.063 | 5.9 |
| | | | | | 1625 | 52.25 | 8.37 | 0.81 | 0.063 | 20.1 |

Figure 1B:
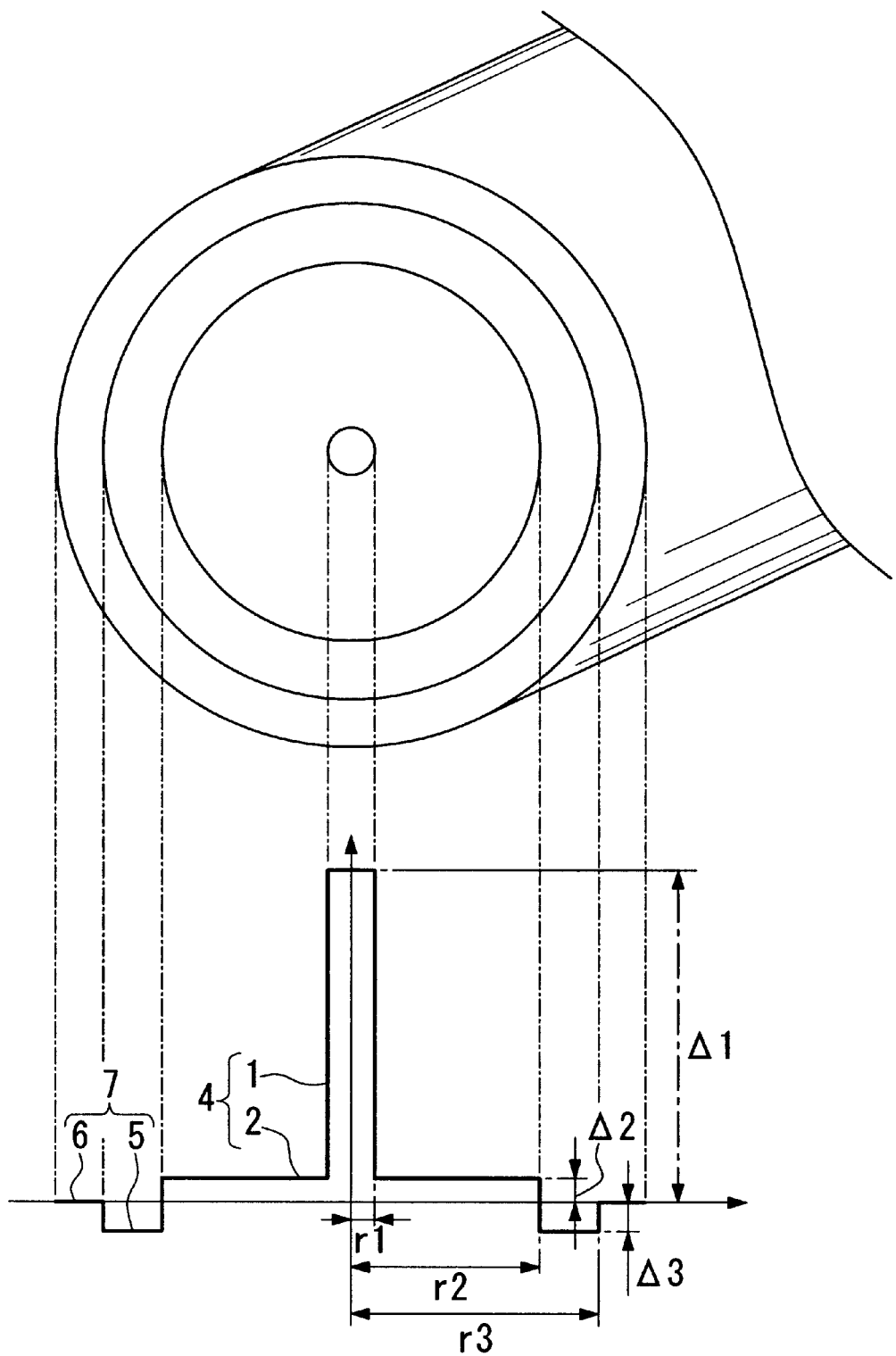
FIG. 1B is a diagram of a second example of a refractive index distribution shape for a dispersion-shifted optical fiber of the present invention.

FIG. 1B represents a second example of a refractive index distribution shape for a dispersion-shifted optical fiber in this embodiment.

This refractive index distribution shape differs from the refractive index distribution shape in the first example described in the foregoing in that the clad 7 has a two-layer structure comprising a first clad 5 and a second clad 6.

In this clad 7, the refractive index of the outermost second clad 6 is high, while the first clad 5 has a lower refractive index than that of the second clad 6.

In this figure, the symbol r3 is the radius of the first clad 5, while Δ3 is the relative refractive-index difference of the first clad 5 when the refractive index of the outermost second clad 6 is taken as the reference. The symbols r1 and r2 are the same as those indicated in FIG. 1A, while Δ1 and Δ2, respectively, represent the relative refractive-index differences of the center core portion 1 and of the step core portion 2 when the refractive index of the second clad 6 is taken as the reference.

In this example, the center core portion 1 and the step core portion 2 are formed from germanium-doped quartz glass, the first clad 5 from fluorine-doped quartz glass to which has been added fluorine which exhibits the effect of lowering the refractive index, and the second clad 6 from pure quartz glass.

As in the first example, moreover, the boundaries between each layer (i.e. the center core portion 1, step core portion 2, first clad 5, and second clad 6) need not be definite, but may instead be in a rounded condition exhibiting so-called sagging.

In dispersion-shifted optical fiber having the refractive index distribution shape of the second example, by setting the respective structural parameters for the center core portion 1 and the step core portion 2, namely r1 and Δ1, on one hand, and r2 and Δ2, on the other, so that they fall satisfactorily within the numerical ranges for r2/r1, Δ2/Δ1, and Δ1 indicated in the first example described earlier, and so that Aeff and the other characteristic values in this embodiment can be realized, the same benefits are obtained as in the first example.

By effecting the configuration with the first clad 5 added, it becomes possible to reduce the bending loss further than with the first example. While not constituting particular limitations, by adopting this second example of refractive index distribution shape, the bending loss can be set to 100 dB/m or less, and preferably to 40 dB/m or less.

A benefit can also be realized in that, depending on how the structural parameters (combinations thereof) are set, moreover, the cutoff wavelength can be made even shorter, or the Aeff can be expanded further.

Figure 4:
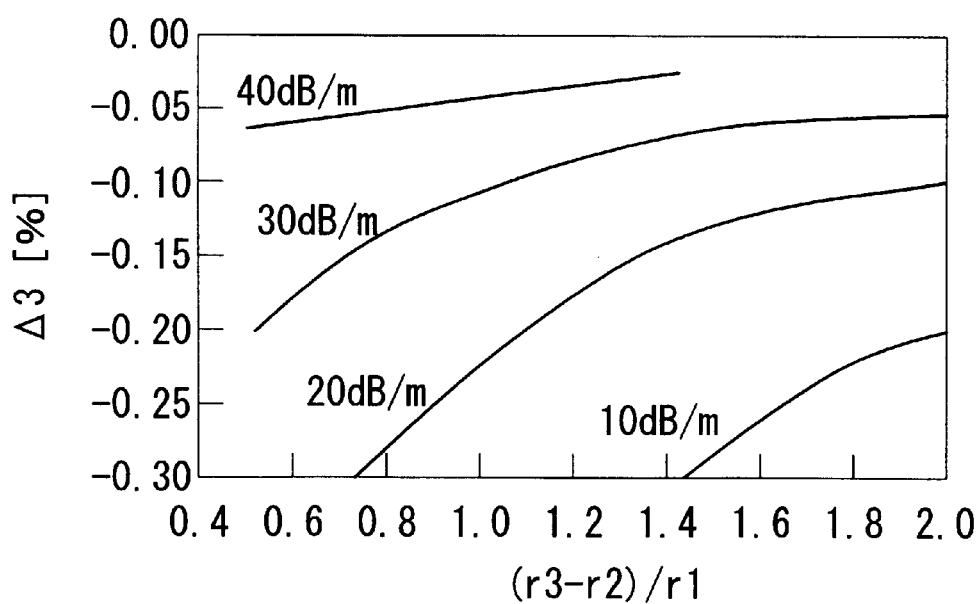
FIG. 4 is a graph representing the variation in the bending loss according to combinations of values of Δ3 and (r3−r2)/r1 when the second example of the refractive index distribution shape diagrammed in FIG. 1B is used in the first embodiment.

FIG. 4 is a graph that shows the changes in the bending loss resulting from combinations of Δ3 and (r3−r2)/r1 when Δ3 and r3 are varied while holding Δ1, Δ2, r1, and r2 constant. Values of (r3–r2)/r1 are plotted on the horizontal axis while values of Δ3 are plotted on the vertical axis. Δ1 is 0.61%, Δ2 is 0.05%, and r2/r1 is 10.

applications primarily in the C band. As in the first example, designs are possible which presume specifications for the L band and not only for the C band.

TABLE 3

| r2/r1 | (r3–r2)/r1 | Δ2/Δ1 | Δ1 [%] | Δ3 [%] | 2 × r3 [μm] | λcf [nm] | λop [nm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|---|---|
| 7 | 0 | 0.1 | 0.625 | 0 | 30.41 | 1346 | 1490 | 47.80 | 8.03 | −5.93 | 0.067 | 5.5 |
|   |   |   |   |   |   |   | 1550 | 54.20 | 8.52 | −1.92 | 0.067 | 14.9 |
|   |   |   |   |   |   |   | 1625 | 63.27 | 9.20 | 3.10 | 0.068 | 41.2 |
| 7 | 0.5 | 0.1 | 0.625 | −0.3 | 31.96 | 1235 | 1490 | 48.75 | 8.10 | −6.69 | 0.072 | 4.2 |
|   |   |   |   |   |   |   | 1550 | 55.25 | 8.61 | −2.40 | 0.072 | 10.9 |
|   |   |   |   |   |   |   | 1625 | 64.83 | 9.30 | 3.03 | 0.073 | 28.4 |
| 7 | 1 | 0.1 | 0.625 | −0.16 | 34.25 | 1259 | 1490 | 48.51 | 8.08 | −6.17 | 0.071 | 3.5 |
|   |   |   |   |   |   |   | 1550 | 54.93 | 8.59 | −1.93 | 0.071 | 9.2 |
|   |   |   |   |   |   |   | 1625 | 64.41 | 9.27 | 3.43 | 0.072 | 24.3 |
| 7 | 2 | 0.1 | 0.625 | −0.16 | 38.3 | 1304 | 1490 | 48.84 | 8.11 | −6.48 | 0.072 | 2.1 |
|   |   |   |   |   |   |   | 1550 | 55.36 | 8.62 | −2.16 | 0.072 | 5.6 |
|   |   |   |   |   |   |   | 1625 | 64.98 | 9.31 | 3.32 | 0.074 | 14.5 |
| 10 | 0 | 0.09 | 0.61 | 0 | 43.7 | 1488 | 1490 | 48.55 | 8.09 | −6.22 | 0.066 | 19.7 |
|   |   |   |   |   |   |   | 1550 | 54.94 | 8.59 | −2.33 | 0.064 | 50.5 |
|   |   |   |   |   |   |   | 1625 | 64.57 | 9.29 | 2.46 | 0.064 | 132.5 |
| 10 | 1 | 0.09 | 0.61 | −0.3 | 47.99 | 1496 | 1490 | 48.64 | 8.10 | −5.88 | 0.066 | 5.7 |
|   |   |   |   |   |   |   | 1550 | 55.06 | 8.60 | −1.96 | 0.065 | 14.7 |
|   |   |   |   |   |   |   | 1625 | 64.71 | 9.30 | 2.90 | 0.065 | 38.2 |
| 10 | 1.5 | 0.09 | 0.61 | −0.3 | 50.17 | 1567 | 1490 | 48.64 | 8.10 | −6.15 | 0.066 | 3.5 |
|   |   |   |   |   |   |   | 1550 | 55.06 | 8.60 | −2.33 | 0.065 | 9.2 |
|   |   |   |   |   |   |   | 1625 | 64.71 | 9.30 | 2.64 | 0.065 | 23.8 |
| 10 | 2 | 0.09 | 0.61 | −0.06 | 52.41 | 1491 | 1490 | 48.58 | 8.09 | −6.20 | 0.066 | 10.8 |
|   |   |   |   |   |   |   | 1550 | 54.98 | 8.60 | −6.20 | 0.066 | 27.8 |
|   |   |   |   |   |   |   | 1625 | 64.62 | 9.29 | 2.52 | 0.065 | 72.5 |

From this graph, it is apparent that the bending loss tends to become smaller the more Δ3 shifts from zero to a minus value, that is, the more the refractive index of the first clad 5 becomes smaller and the drop in the refractive index caused by the first clad 5 becomes greater. The bending loss also tends to become smaller the more the value of (r3–r2)/r1, which is to say the value of r3, becomes larger.

Thus, because the bending loss varies according to the combinations of Δ3 and (r3–r2)/r1, there is comparatively great freedom in setting the structural parameters (Δ3, r3) for the first clad 5 in order to satisfactorily realize a favorable numerical range for the bending loss.

In FIG. 4, for example, a bending loss of 30 dB/m or so can be obtained both with the combination where (r3–r2)/r1 is 0.6 and Δ3 is −0.18%, and with the combination where (r3–r2)/r1 is 1.8 and Δ3 is −0.05%. Accordingly, if only bending loss is considered, either of these combinations may be adopted.

However, because the transmission loss tends to worsen when Δ3 becomes small (i.e. when that value shifts toward the minus side), it is preferable that Δ3 be −0.3% or greater.

Also, because problems in manufacturing arise when the value of (r3–r2)/r1 becomes large (i.e. when r3 becomes large), it is preferable that (r3–r2)/r1 be set at 4.0 or less. And because it is necessary to set Δ3 to a small value when (r3–r2)/r1 is small, transmission loss tends to worsen, and problems also arise in manufacturing, wherefore it is preferable that (r3–r2)/r1 be 0.2 or greater.

Table 3 represents specific design examples of dispersion-shifted optical fibers that satisfy such conditions as these. In each of these examples, characteristics are obtained which satisfy the preferred numerical ranges for Aeff, dispersion slope, chromatic dispersion value, bending loss, and cutoff wavelength in this embodiment, such as are suitable for a wavelength division multiplexed transmission system. The design examples in this table are examples that presume In this embodiment, a dispersion-shifted optical fiber is obtained which satisfies the conditions of being substantially single-mode and exhibiting a bending loss of 100 dB/m or less, wherewith also the Aeff can be adequately expanded and the dispersion slope sufficiently reduced. With this embodiment, more particularly, very small values for the dispersion slope can be realized.

Accordingly, a dispersion-shifted optical fiber can be provided that is particularly ideal for wavelength division multiplexed transmission systems.

Also, because a comparatively simple refractive index distribution shape is exhibited, there are few structural parameters that need to be controlled during manufacture, which is a manufacturing advantage, making it possible to obtain the desired characteristics efficiently.

Second Embodiment

A first example of the refractive index distribution shape in the dispersion-shifted optical fiber of this second embodiment is the same as the refractive index distribution shape diagrammed in FIG. 1A, described earlier, being a dual-shape form configured by a core 4 wherein a step core portion 2 is provided about the outer circumference of a center core portion 1, and clad 7 of single-layer structure having a uniform refractive index is provided about the outer circumference thereof.

The center core portion 1 exhibits the highest refractive index, the step core portion 2 has a lower refractive index than the center core portion 1, and the clad 7 has a refractive index lower than the step core portion 2.

In this example, the center core portion 1 and step core portion 2 are formed from a germanium-doped quartz glass to which has been added germanium which exhibits the effect of raising the refractive index, while the clad 7 is formed from pure quartz glass, for example.

In the refractive index distribution shape of the dispersion-shifted optical fiber, furthermore, the boundaries between each layer (i.e. the center core portion 1, step core portion 2, and clad 7) need not be definite, but may instead be in a rounded condition exhibiting so-called sagging, and there is no particular limitation thereon so long as the characteristics of the dispersion-shifted optical fiber of this embodiment can be effectively realized.

A second example of the refractive index distribution shape in the dispersion-shifted optical fiber of this embodiment is the same as that diagrammed in FIG. 1B described earlier.

This refractive index distribution shape differs from the refractive index distribution shape of the first example in that the clad 7 here exhibits a two-layer structure comprising a first clad 5 provided about the outer circumference of the step core portion 2 (core 4), and a second clad 6 provided about the outer circumference of the first clad 5.

In this example, the first clad 5 is formed from a fluorine-doped quartz glass to which has been added fluorine which acts to lower the refractive index.

The wavelength band used in the dispersion-shifted optical fiber of this embodiment is selected from a range of 1490 to 1625 nm, but generally from a range of 1490 to 1610 nm, as a wavelength band of suitable wavelength width. For example, a wavelength band (such as 1500 to 1520 nm) is selected, from the 1490 to 1530 nm range, that has a prescribed wavelength width. Or a wavelength band (such as 1540 to 1565 nm) is selected, from the 1530 to 1570 nm range, that has a prescribed wavelength width. Or a wavelength band (such as 1570 to 1600 nm) that has a prescribed wavelength width is selected from the 1570 to 1625 nm range that is the so-called L band, generally from the 1570 to 1610 nm range.

Thus one of the characteristics of this embodiment is that the wavelength band used can be selected from the L band.

Alternatively, the entire 1490 to 1625 nm region can be made the wavelength band (transmission wavelength band) used.

In the dispersion-shifted optical fiber of this embodiment, the chromatic dispersion value is made from +0.05 to +10.0 ps/km/nm. When that value is smaller than +0.05 ps/km/nm, the chromatic dispersion value approaches zero, and four-wave mixing, which is one of nonlinear optical effects, readily occurs, wherefore that is problematic. When +10.0 ps/km/nm is exceeded, on the other hand, waveform distortion occurs, and the transmission characteristics sometimes deteriorate markedly.

The Aeff is found by the same mathematical formula as was indicated in the first embodiment described earlier.

The dispersion-shifted optical fiber in this embodiment has an Aeff of 45 to 70 $\mu m^2$ in the wavelength band used, wherefore the nonlinear optical effects can be suppressed. When the Aeff is less than 45 $\mu m^2$, the reduction in the nonlinear optical effects is insufficient, whereas when 70 $\mu m^2$ is exceeded, manufacture becomes very difficult.

The very small values of 0.050 to 0.075 ps/km/nm$^2$ can be realized for the dispersion slope in the wavelength band used. As a consequence, deterioration in transmission induced by the dispersion slope in wavelength division multiplexed transmissions can be prevented.

The bending loss is defined in the same way that it was earlier mentioned.

The smaller the bending loss is the better. In this embodiment, the bending loss is made to be 100 dB/m or less, and preferably 50 dB/m or less. When 100 dB/m is exceeded, transmission loss readily worsens due to slight bends imparted to the dispersion-shifted optical fiber, and unnecessary losses occur during laying operations or other handling, which is problematic.

Also, because the dispersion-shifted optical fiber in this embodiment is single-mode optical fiber, it is necessary to have a cutoff wavelength that guarantees substantially single-mode propagation in the wavelength band used.

As was stated earlier, ordinary cutoff wavelengths are defined by values based on the CCITT's 2m method (hereinafter called the 2m method). However, in actual long-length use conditions, single-mode propagation is possible even when this value is on the longer wavelength side from the lower limiting value in the wavelength band used.

That being so, in the dispersion-shifted optical fiber of this embodiment, the cutoff wavelength defined by the 2m method is set so that single-mode propagation is possible according to the length of the dispersion-shifted optical fiber used and the wavelength band used. More specifically, if the cutoff wavelength obtained with the 2m method is 1800 nm, under the large length conditions of 5000 m or so, it is possible to effect single-mode propagation in the wavelength band used as described in the foregoing.

In this embodiment, moreover, the larger diameter solution is used for the core diameter (r2×2). More specifically, as will be described subsequently, in setting the four structural parameters r2, r1, Δ2, and Δ1 in the refractive index distribution shape diagrammed in FIG. 1A, and in setting the six structural parameters that include those noted above plus r3 and Δ3 in the refractive index distribution shape diagrammed in FIG. 1B, design conditions are established such that the core diameter becomes the larger diameter solution, and such that such characteristic values as Aeff and dispersion slope are satisfied in the desired wavelength band described in the foregoing. Also, such conventional methods as CVD and VAD can be employed as the actual method of manufacturing the dispersion-shifted optical fiber of this embodiment. Because the refractive index distribution shape for the dispersion-shifted optical fiber in this embodiment is in a three-layer or four-layer configuration, and because it is a comparatively simple step shape, controlling the structural parameters is comparatively easy.

Figure 5:
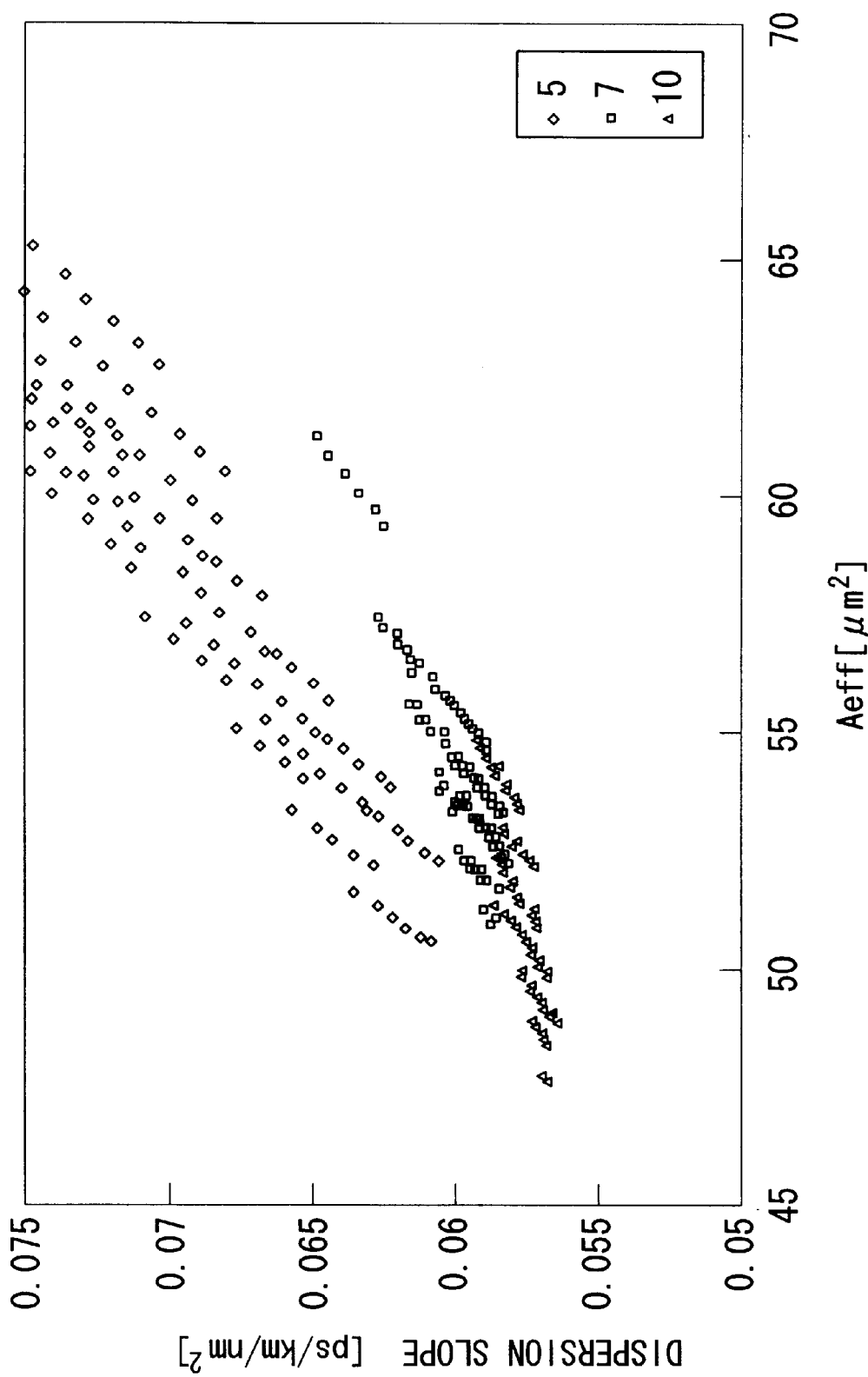
FIG. 5 is a graph representing an example analysis when the refractive index distribution shape diagrammed in FIG. 1A is used in a second embodiment.

FIG. 5 is a graph representing an example of the results of an analysis of the structural parameters of a dispersion-shifted optical fiber having the refractive index distribution shape diagrammed in FIG. 1A.

The values 5, 7, and 10 corresponding to the symbols ◇, □, and Δ represented in the graph are values for r2/r1 that is the ratio between the radiuses of the center core portion 1 and the step core portion 2 diagrammed in FIG. 1A. Aeff is plotted on the horizontal axis and dispersion slope on the vertical axis, both of which are values for the wavelength 1550 nm.

It will be seen from this graph that the larger the value of r2/r1 becomes, the more can the dispersion slope be reduced. In order to obtain bending loss and Aeff values within the preferable numerical ranges noted in the foregoing, r2/r1 should be set at 4 or higher. When that value is less than 4, it is very difficult to obtain good characteristics. When the value set exceeds 12, on the other hand, manufacturability declines. Hence the real upper limit is considered to be 12. These conditions are the same in the refractive index distribution shape diagrammed in FIG. 1B.

In this embodiment, furthermore, Δ1 is made to range from 0.55% to 0.75% in the refractive index distribution shapes diagrammed in FIGS. 1A and 1B. When Δ1 is less than 0.55%, it becomes very difficult to set the chromatic dispersion value in a desirable range, and bending loss tends to become great. If Δ1 exceeds 0.75%, it becomes very difficult to make Aeff sufficiently large.

It is preferable that the Δ2/Δ1 ratio be from 0.05 to 0.15. At values lower than 0.05, bending loss becomes large, so that is problematic. When 0.15 is exceeded, the dispersion slope will exceed the defined range, which is problematic for use in wavelength division multiplexed transmission.

Table 4 reflects simulation results representing structural parameters and characteristic values for specific design examples of dispersion-shifted optical fibers having the refractive index distribution shape diagrammed in FIG. 1A which satisfy these conditions.

respectively, in a refractive index distribution shape comprising the two-layer clad structure diagrammed in FIG. 1B. The estimated wavelength is 1550 nm.

Δ1, Δ2, r1, and r2 are all common values and are set constant. That is, Δ1 is 0.56%, and Δ2 is 0.06%.

From these graphs it will be seen that Aeff can be made larger when Δ3 becomes smaller, but the bending loss then also becomes large.

The behavior will also be different according to the value of (r3−r2)/r1.

Accordingly, structural parameters are set so as to satisfy the preferable numerical ranges of the characteristics described earlier, taking the relationships between these structural parameters and the characteristics into consideration.

TABLE 4

| r2/r1 | Δ2/Δ1 | Δ1 [%] | r2 [μm] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|
| 10.00 | 0.07 | 0.57 | 25.66 | 1.09 | 51.55 | 8.34 | 5.35 | 0.057 | 17.70 |
| 10.00 | 0.07 | 0.58 | 25.78 | 1.10 | 50.24 | 8.23 | 5.51 | 0.057 | 10.30 |
| 8.00 | 0.08 | 0.60 | 20.10 | 1.30 | 49.71 | 8.19 | 4.61 | 0.057 | 5.66 |
| 5.00 | 0.12 | 0.60 | 12.60 | 1.32 | 51.85 | 8.36 | 5.00 | 0.061 | 2.19 |
| 4.00 | 0.15 | 0.62 | 9.54 | 1.28 | 52.89 | 8.45 | 4.68 | 0.068 | 1.69 |
| 4.00 | 0.15 | 0.65 | 9.63 | 1.35 | 49.56 | 8.18 | 4.53 | 0.066 | 0.35 |

MFD is the mode field diameter
λc (cutoff wavelength) is based on the 2m method
The estimated wavelength is 1550 nm
Bending loss is measured for φ20 mm In every example, preferable numerical ranges are satisfactorily realized for the Aeff, dispersion slope, chromatic dispersion value, bending loss, and cutoff wavelength in this embodiment, and characteristics are obtained which are suitable for wavelength division multiplexed transmission systems.

Furthermore, these characteristic values will not necessarily be obtained, even when suitable values are selected and combined from the numerical ranges of such structural parameters as described in the foregoing; it is necessary to select combinations of structural parameters that satisfy the characteristic values from the graph(s) and simulation results described in the foregoing. That being so, because it is very difficult to specify the dispersion-shifted optical fiber of this embodiment by the structural parameters, that specification is made here by the characteristic values.

In the refractive index distribution shape diagrammed in FIG. 1B, moreover, Δ3 and r3 are set. By giving the clad 7 a two-layer structure comprising the first clad 5 and the second clad 6, the cutoff wavelength can be made even shorter than in the first example, by combining (setting) the structural parameters, and the Aeff can be further expanded.

Figure 6A:
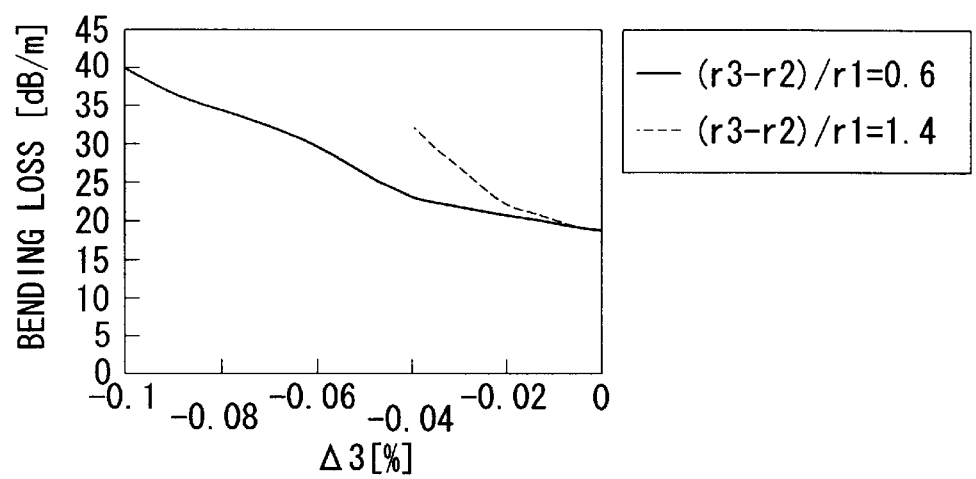
FIGS. 6A and 6B are graphs plotting the variation in bending loss and Aeff, respectively, according to combinations of values of Δ3 and (r3−r2)/r1 when the second example of refractive index distribution shape diagrammed in FIG. 1B is used in the second embodiment.
Figure 6B:
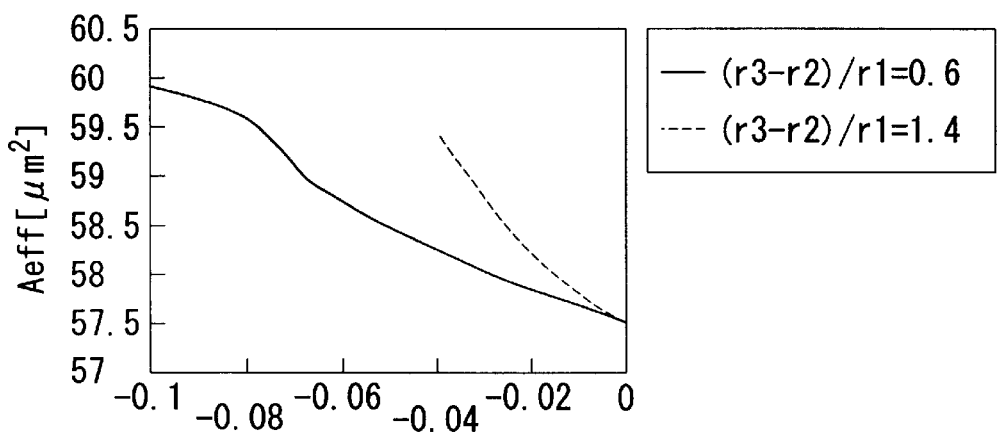

FIGS. 6A and 6B represent the relationship between Δ3 and bending loss and the relationship between Δ3 and Aeff, It is preferable to make the value of Δ3−0.1% or greater. The reason for this is that, when Δ3 is smaller than −0.1%, the transmission characteristics will sometimes deteriorate, depending on the combinations with the other structural parameters.

It is also preferable to make the value of (r3−r2)/r1 4.0 or less for manufacturing reasons. When (r3−r2)/r1 is small, however, it becomes necessary to make Δ3 small. Therefore, in order to limit deterioration in the transmission characteristics, as described earlier, (r3−r2)/r1 should be made 0.2 or greater.

In Table 5 are given simulation results indicating structural parameters and characteristic values in specific design examples for dispersion-shifted optical fibers that satisfy these conditions.

In every example, preferable numerical ranges are satisfactorily realized for the Aeff, dispersion slope, chromatic dispersion value, bending loss, and cutoff wavelength in the dispersion-shifted optical fiber of this embodiment, and characteristics are obtained which are suitable for wavelength division multiplexed transmission systems.

TABLE 5

| r2/r1 | (r3−r2)/r1 | Δ2/Δ1 | Δ1 [%] | Δ3 [%] | r3 [μm] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|---|
| 10.00 | 4.00 | 0.07 | 0.57 | −0.05 | 35.80 | 1.29 | 51.66 | 8.35 | 5.23 | 0.058 | 7.04 |
| 5.00 | 1.50 | 0.12 | 0.60 | −0.05 | 16.00 | 1.26 | 52.53 | 8.42 | 4.59 | 0.064 | 2.60 |
| 8.00 | 4.00 | 0.08 | 0.60 | −0.03 | 30.08 | 1.36 | 49.78 | 8.19 | 4.52 | 0.057 | 3.77 |

TABLE 5-continued

| r2/r1 | (r3−r2)/r1 | Δ2/Δ1 | Δ1 [%] | Δ3 [%] | r3 [μm] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|---|
| 10.00 | 2.00 | 0.07 | 0.58 | −0.03 | 30.98 | 1.14 | 50.21 | 8.22 | 5.55 | 0.057 | 7.69 |
| 4.00 | 2.50 | 0.15 | 0.62 | −0.05 | 16.22 | 1.30 | 51.21 | 8.32 | 5.95 | 0.066 | 0.36 |
| 4.00 | 2.50 | 0.15 | 0.65 | −0.02 | 15.60 | 1.32 | 49.53 | 8.18 | 4.65 | 0.067 | 0.32 |
| 4.00 | 0.60 | 0.11 | 0.56 | −0.1 | 11.23 | 1.07 | 56.0 | 8.70 | 5.96 | 0.068 | 11.70 |
| 4.00 | 0.60 | 0.11 | 0.56 | −0.08 | 11.15 | 1.07 | 56.4 | 8.73 | 5.73 | 0.068 | 13.30 |

MFD is the mode field diameter
λc (cutoff wavelength) is based on the 2m method
The estimated wavelength is 1550 nm
Bending loss is measured for φ20 mm The estimated wavelength for the dispersion-shifted optical fiber characteristics given in Tables 4 and 5 is 1550 nm.

The results of the same simulations conducted with the estimated wavelength set at 1610 nm are given in Tables 6 and 7. Characteristic values that satisfy the numerical ranges in this embodiment are obtained in all of the examples given in Tables 4 to 7. That being so, with all of the dispersion-shifted optical fibers represented in Tables 4 to 7, not only in the 1550 nm band, but also in a broader band (1490 to 1610 nm, for example) to which 1570 to 1625 have been added, chromatic dispersion can be made small, bending loss made small, and single-mode transmission guaranteed, while at the same time, due to the expansion in Aeff, the nonlinear optical effects can be suppressed, and, due to the small dispersion slope, transmission deterioration in wavelength division multiplexed transmissions can be limited.

Accordingly, transmission characteristic enhancement can be effected even in a wavelength division multiplexed transmission system employed in a wide wavelength band to which the L band has been added.

TABLE 6

| r2/r1 | Δ2/Δ1 | Δ1 [%] | r2 [μm] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|
| 10 | 0.07 | 0.57 | 25.7 | 1.09 | 56.8 | 8.75 | 8.73 | 0.056 | 44.3 |
| 5 | 0.12 | 0.6 | 12.6 | 1.32 | 57.2 | 8.79 | 8.62 | 0.060 | 6.06 |
| 8 | 0.08 | 0.6 | 20.1 | 1.30 | 54.8 | 8.6 | 7.98 | 0.055 | 15.6 |
| 10 | 0.07 | 0.58 | 25.8 | 1.10 | 55.2 | 8.63 | 8.85 | 0.055 | 27.4 |
| 4 | 0.15 | 0.62 | 9.5 | 1.28 | 58.5 | 8.89 | 8.73 | 0.067 | 4.69 |
| 4 | 0.15 | 0.65 | 9.6 | 1.35 | 54.6 | 8.59 | 8.43 | 0.065 | 1.18 |

MFD is the mode field diameter
λc (cutoff wavelength) is based on the 2m method
The estimated wavelength is 1610 nm
Bending loss is measured for φ20 mm

TABLE 7

| r2/r1 | (r3−r2)/r1 | Δ2/Δ1 | Δ1 [%] | Δ3 [%] | r3 [μm] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|---|---|
| 10 | 4 | 0.07 | 0.57 | −0.05 | 35.80 | 1.285 | 56.94 | 8.77 | 8.62 | 0.056 | 17.7 |
| 5 | 1.5 | 0.12 | 0.6 | −0.05 | 16.00 | 1.257 | 58.1 | 8.86 | 8.38 | 0.063 | 6.87 |
| 8 | 4 | 0.08 | 0.6 | −0.03 | 30.08 | 1.358 | 54.88 | 8.61 | 7.91 | 0.056 | 10.3 |
| 10 | 2 | 0.07 | 0.58 | −0.03 | 30.98 | 1.14 | 55.14 | 8.62 | 8.90 | 0.055 | 20.5 |
| 4 | 2.5 | 0.15 | 0.62 | −0.05 | 16.22 | 1.3 | 56.15 | 8.71 | 9.87 | 0.065 | 1.09 |
| 4 | 2.5 | 0.15 | 0.65 | −0.02 | 15.60 | 1.316 | 54.48 | 8.58 | 8.62 | 0.066 | 1 |
| 4 | 0.6 | 0.11 | 0.56 | −0.1 | 11.23 | 1.071 | 61.87 | 9.14 | 10.00 | 0.067 | 26 |
| 4 | 0.6 | 0.11 | 0.56 | −0.08 | 11.15 | 1.066 | 62.44 | 9.19 | 9.79 | 0.067 | 29.2 |

MFD is the mode field diameter
λc (cutoff wavelength) is based on the 2m method
The estimated wavelength is 1610 nm
Bending loss is measured for φ20 mm Benefits such as those described below are realized in the dispersion-shifted optical fiber of this embodiment.

That is, under such conditions as that of being substantially single-mode and maintaining bending loss at 100 dB/m or less, both the suppression of nonlinear optical effects due to Aeff expansion and the reduction of the dispersion slope can be satisfactorily realized simultaneously, and good transmission characteristics obtained. These characteristics are particularly effective in wavelength division multiplexed transmission.

Also, because of the comparatively simple step structure, it is easy to control the structural parameters during manufacture, and dispersion-shifted optical fiber having stable characteristics can be manufactured efficiently.

Also, the characteristics noted above can be maintained even in a broad wavelength band that extends from 1490 to 1625 nm, with the L band included, and it is possible to cope with the longer haul covered and higher volumes handled by wavelength division multiplexed systems.

In particular, practicable bending loss can be realized in the L band.

Third Embodiment

One example of the refractive index distribution shape in the dispersion-shifted optical fiber in this embodiment is the same as that diagrammed in FIG. 1A described earlier, comprising a core 4 having a step core portion 2 provided about the outer circumference of a center core portion 1, and a one-layer structured clad 7 having uniform refractive index provided about the outer circumference thereof.

The center core portion 1 has the highest refractive index, the step core portion 2 has a lower refractive index than the center core portion 1, and the clad 7 has a lower refractive index than the step core portion 2.

In this example, the center core portion 1 and the step core portion 2 are formed from germanium-doped quartz glass to which has been added germanium which exhibits an effect to raise the refractive index, while the clad 7 is formed from pure quartz glass.

In the refractive index distribution shape of the dispersion-shifted optical fiber, furthermore, the boundary between each layer (i.e. the center core portion 1, step core portion 2, and clad 7) need not be definite, but may instead be in a rounded condition exhibiting so-called sagging, and need not be particularly limited so long as the characteristics of the dispersion-shifted optical fiber of this embodiment are effectively exhibited.

For the wavelength band used in the dispersion-shifted optical fiber of this embodiment, a wavelength band of suitable wavelength width is selected from the range of 1490 to 1625 nm. Depending on the amplification wavelength band based on the optical fiber amplifier used in the light communication system, for example, a wavelength band (such as 1500 to 1520 nm, for example) that has a prescribed wavelength width is selected from the range of 1490 to 1530 nm. Or a wavelength band (such as 1540 to 1565 nm, for example) that has a prescribed wavelength width is selected from the range of 1530 to 1570 nm. Or a wavelength band (such as 1570 to 1600 nm, for example) that has a prescribed wavelength width is selected from the range of 1570 to 1625 nm. Of these, the 1530 to 1570 nm range is the one being most used in recent years.

The Aeff is found by the same formula as was indicated in the first embodiment.

In this embodiment, because the Aeff ranges from 65 to 95 $\mu m^2$ in the wavelength band used, it is possible to suppress the nonlinear optical effects. When 95 $\mu m^2$ is exceeded, manufacture becomes very difficult.

The dispersion slope in the wavelength band used is made to be from 0.08 to 0.14 ps/km/nm$^2$. If within this range, in wavelength division multiplexed transmission, large transmission deterioration induced by the dispersion slope can be prevented.

Bending loss is defined in the same way as noted earlier.

The smaller the bending loss the better. In this embodiment, bending loss is made 100 dB/m or less, and preferably 50 dB/m or less. When 100 dB/m is exceeded, transmission loss readily worsens due to slight bends imparted to the dispersion-shifted optical fiber, and unnecessary losses occur during laying operations or other handling, which is problematic.

The absolute values of the chromatic dispersion values are made to range from 0.5 to 8.0 ps/km/nm. When the absolute value is smaller than 0.5 ps/km/nm, the chromatic dispersion value approaches zero, which is problematic because four-wave mixing, which is one nonlinear optical effect, then readily occurs. When 8.0 ps/km/nm is exceeded, on the other hand, waveform distortion occurs, and transmission characteristic deterioration may become great.

As will be described later in more specific terms, furthermore, because the chromatic dispersion value can be controlled so as to be either positive or negative, various light communication system demands can be coped with, and dispersion-shifted optical fiber can be designed which is capable of being employed in soliton transmission, for example.

Furthermore, because the dispersion-shifted optical fiber in this embodiment is single-mode optical fiber, it is necessary to have a cutoff wavelength that guarantees substantially single-mode propagation in the wavelength band used.

Ordinary cutoff wavelengths are defined by values based on the CCITT's 2m method (hereinafter called the 2m method). However, under actual long-length use conditions, single-mode propagation is possible even when this value is on the longer wavelength side from the lower limiting value in the wavelength band used.

That being so, in the dispersion-shifted optical fiber of this embodiment, the cutoff wavelength defined by the 2m method is set so that single-mode propagation is possible according to the length of the dispersion-shifted optical fiber used and the wavelength band used. More specifically, if the cutoff wavelength in the 2m method is 1800 nm, under large length conditions of about 5000 m or larger, it is possible to effect single-mode propagation in the wavelength band used as described in the foregoing.

In this embodiment, moreover, the smaller diameter solution is used for the core diameter as described in the foregoing. More specifically, in setting the four structural parameters r2, r1, $\Delta 2$, and $\Delta 1$, design conditions are established such that the core diameter becomes the smaller diameter solution, and such that such characteristic values as Aeff and dispersion slope are satisfied in the desired wavelength band described in the foregoing. Also, such conventional methods as CVD and VAD can be employed as the actual method of manufacturing the dispersion-shifted optical fiber of this embodiment.

Figure 7:
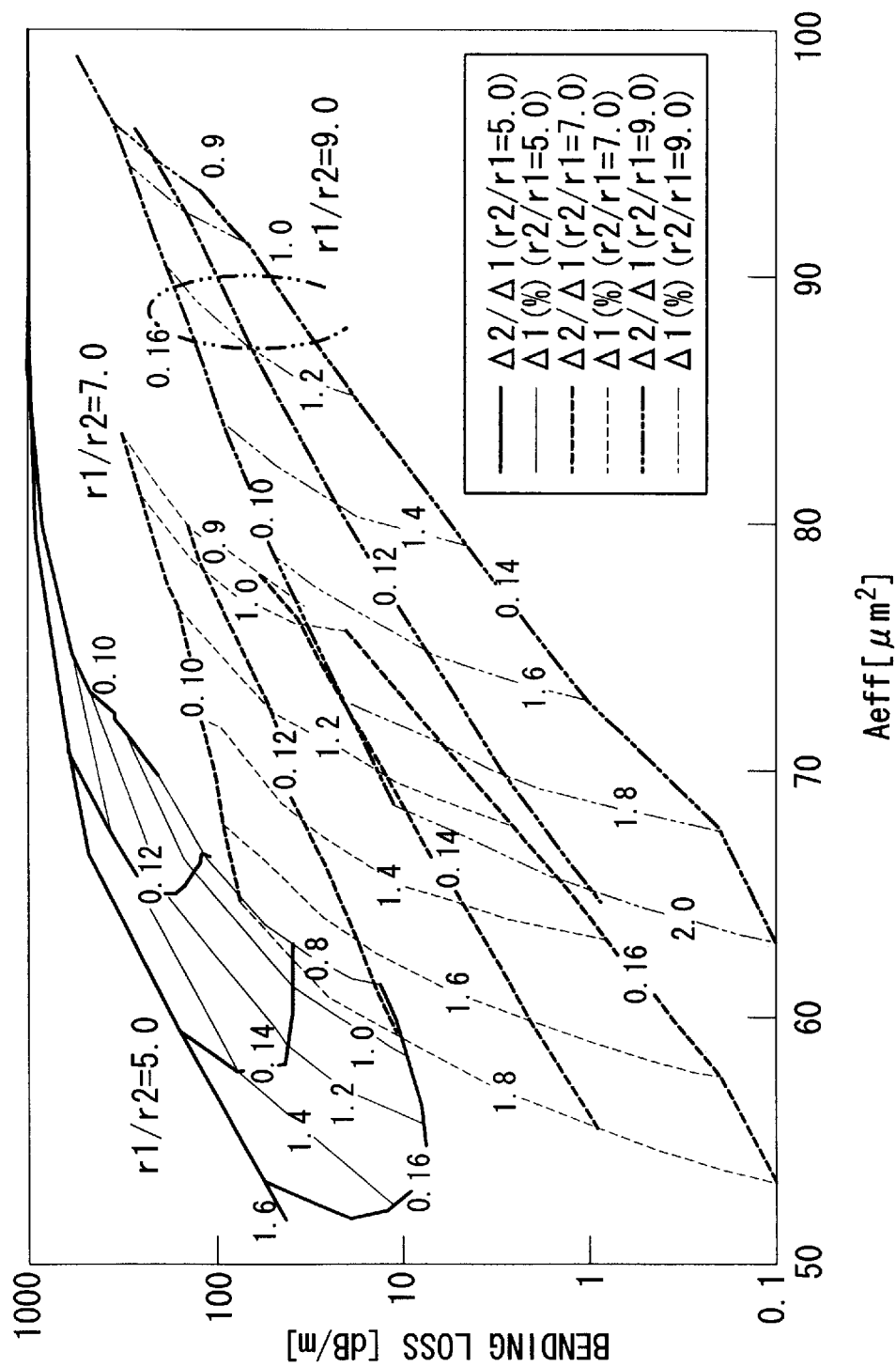
FIG. 7 is a graph of analysis results representing the tracks of the smaller diameter solutions when the values of Δ2/Δ1 and Δ1 are varied at values for r2/r1 of 5.0, 7.0, and 9.0, respectively, in a third embodiment.

FIG. 7 is a graph representing the results of an analysis of the structural parameters of a dispersion-shifted optical fiber, showing the track of the smaller diameter solution when $\Delta 2/\Delta 1$ and $\Delta 1$ are varied when the value of r2/r1 is 5.0, 7.0, and 9.0, respectively.

The $\Delta 2/\Delta 1$ curves represent the characteristics when $\Delta 1$ is varied while holding $\Delta 2/\Delta 1$ constant at the values indicated on the curves. The $\Delta 1$ curves, on the other hand, represent the characteristics when $\Delta 2/\Delta 1$ is varied while holding $\Delta 1$ constant at the values indicated on the curves.

When r2/r1 is 9.0, for example, when moving from right to left in the graph on the $\Delta 2/\Delta 1=0.14$ curve, $\Delta 1$ changes from 0.9 to 2.0. Then, for example, the point where the $\Delta 2/\Delta 1=0.14$ curve intersects the $\Delta 1=1.4$ curve represents the characteristics of the dispersion-shifted optical fiber when $\Delta 2/\Delta 1$ is made 0.14 and $\Delta 1$ is made 1.4.

The analysis conditions, moreover, are that the wavelength used is 1550 nm and the chromatic dispersion value at the wavelength used is −2.0 ps/km/nm. The zero dispersion wavelength, while not constant because the dispersion slope differs, is nevertheless roughly 1565 nm or higher, on the long wavelength side from the wavelength (band) used.

Figure 8:
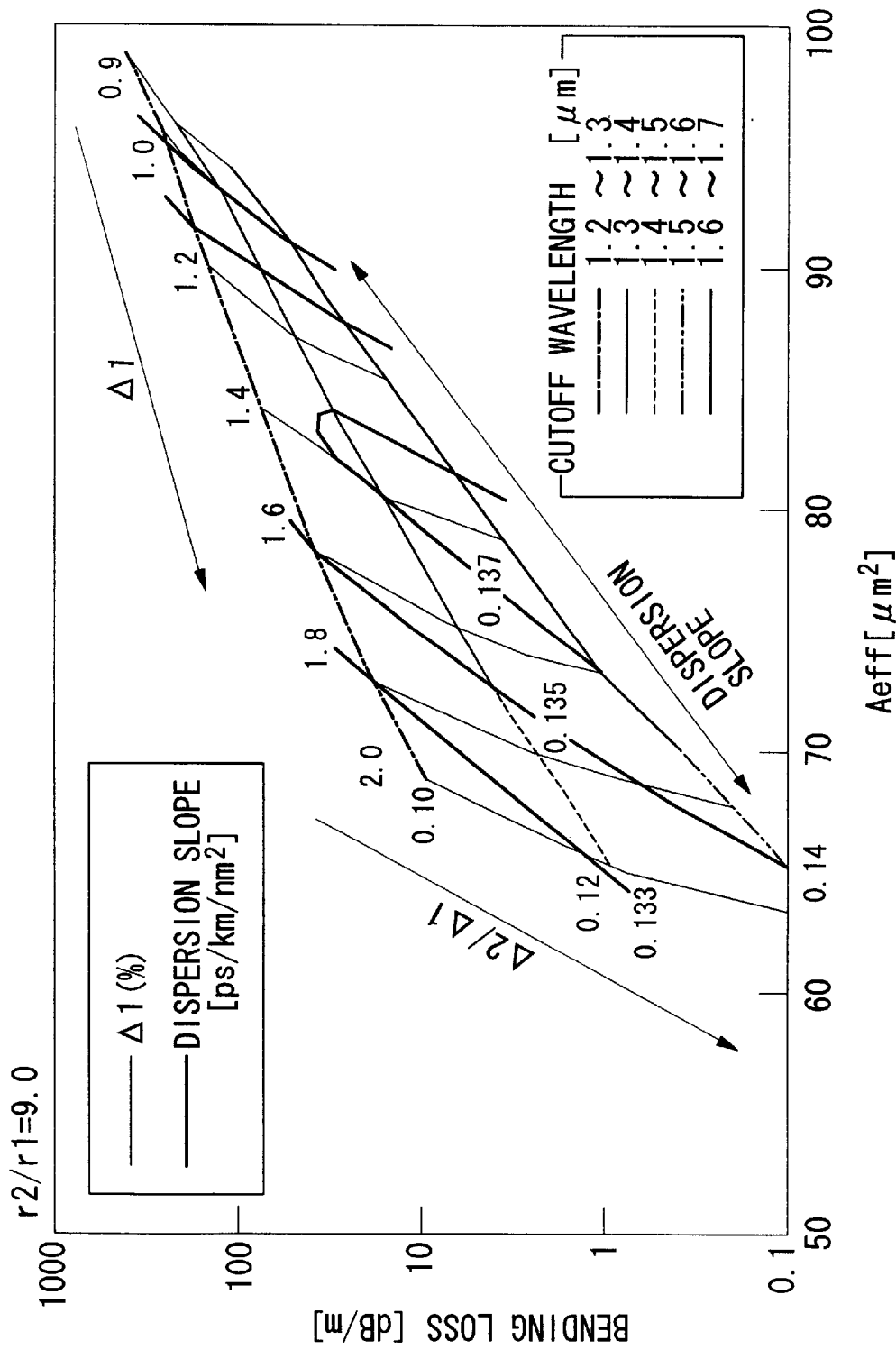
FIG. 8 is a graph representing distributions of characteristic values associated with changes in Δ2/Δ1 and Δ1 when r2/r1 is 7.0 in the third embodiment.
Figure 10A:
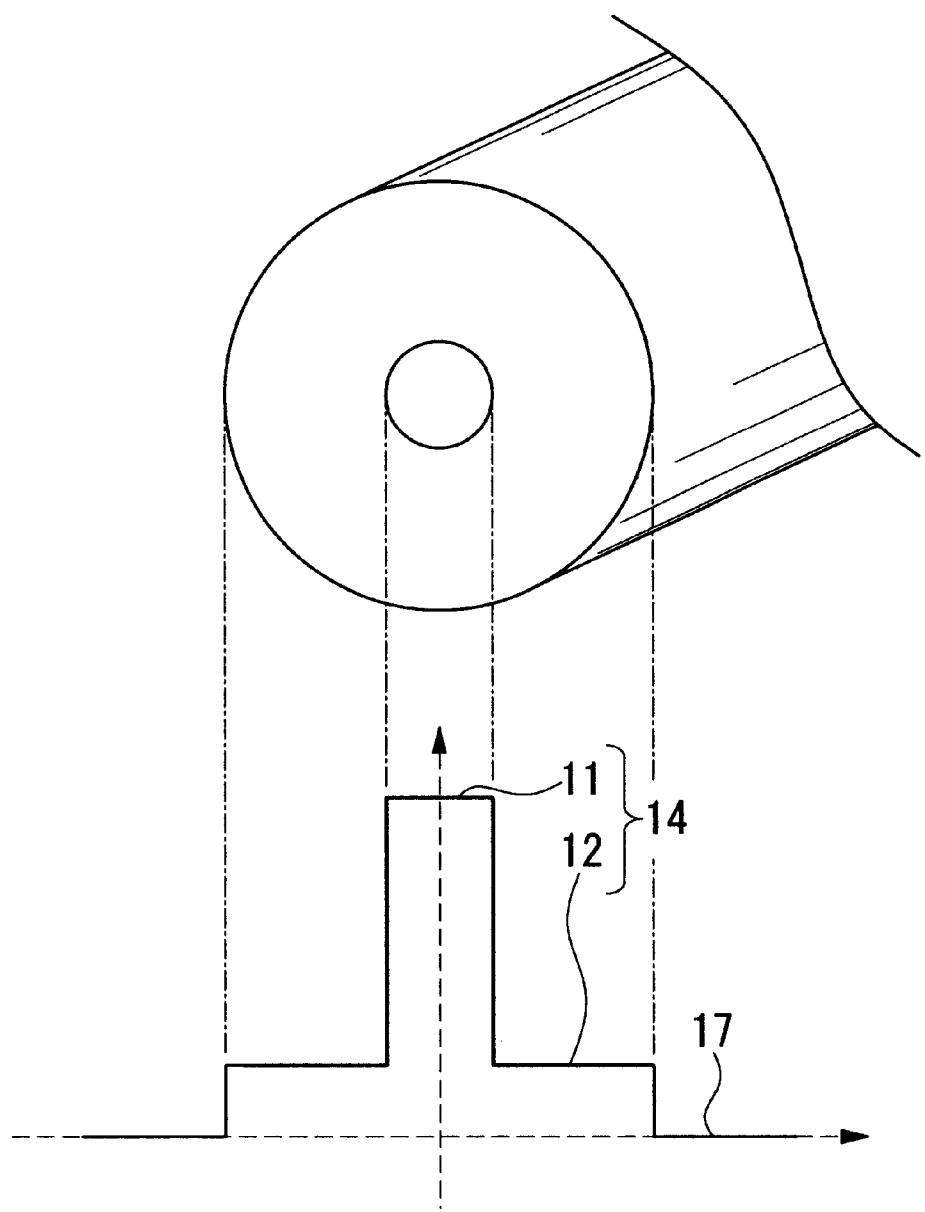
FIG. 10A is a diagram of an example of a dispersion-shifted optical fiber's refractive index distribution shape of the background art.
Figure 10B:
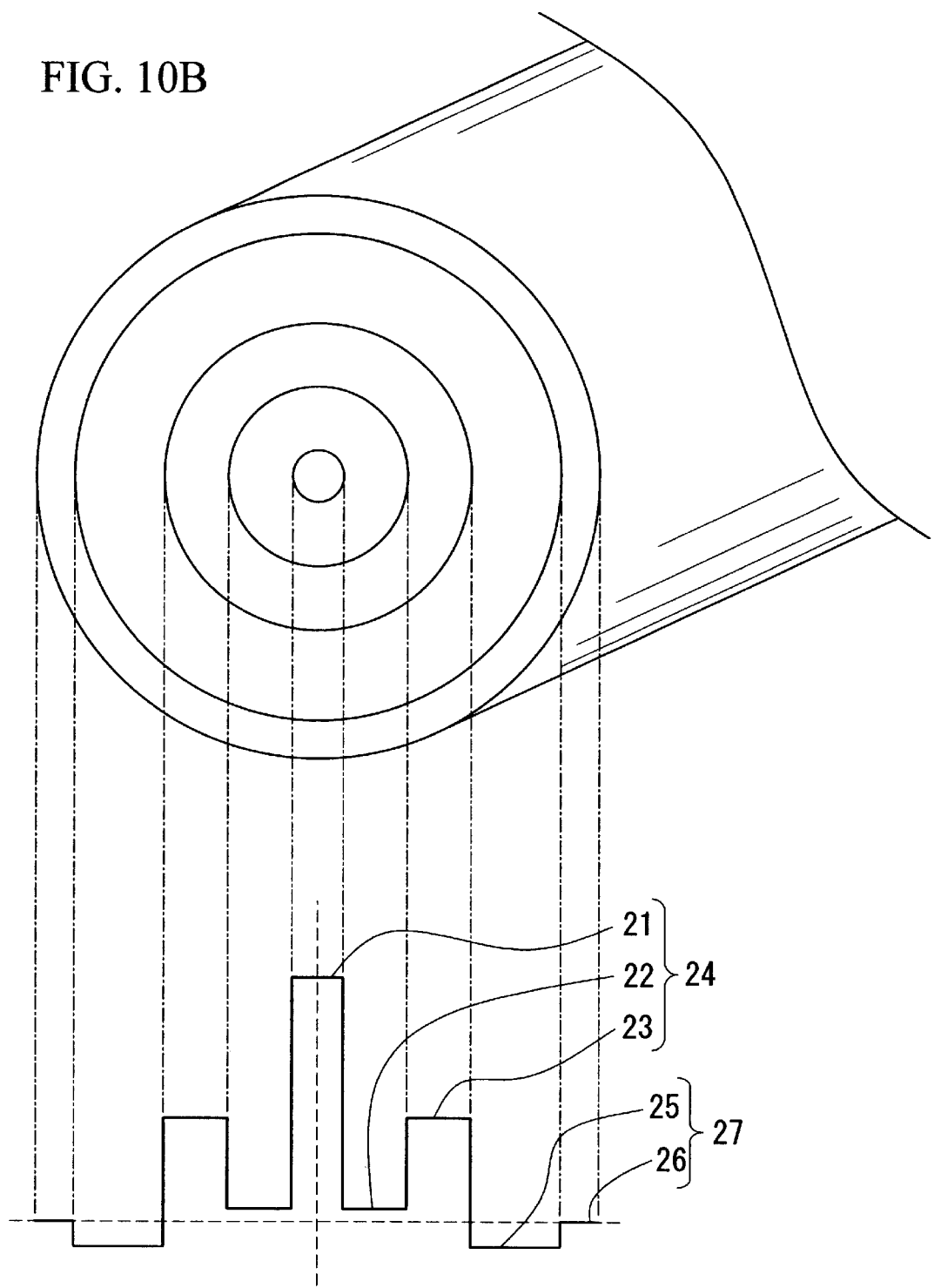
FIG. 10B is a diagram of an example of a dispersion-shifted optical fiber's refractive index distribution shape of the background art.
Figure 10C:
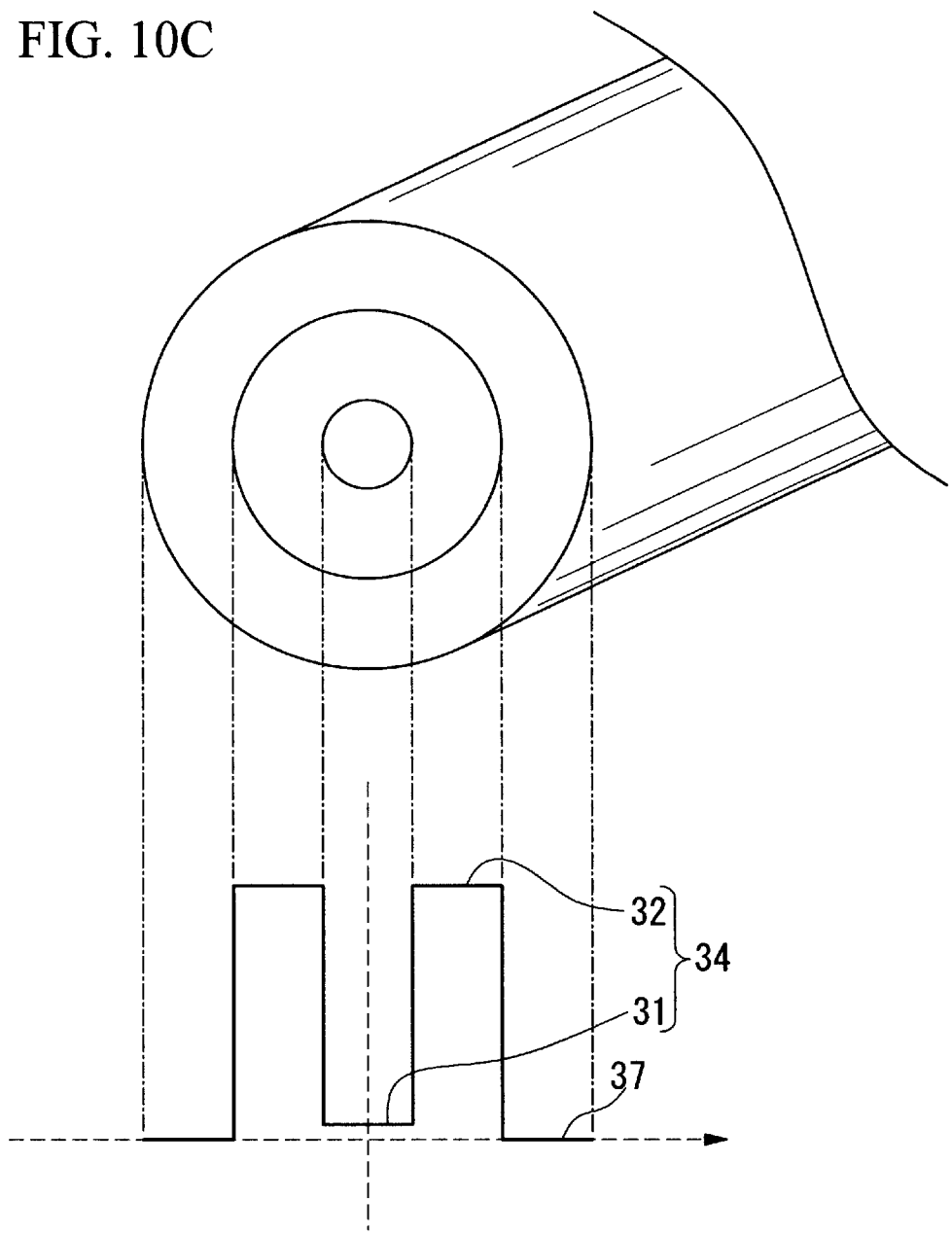
FIG. 10C is a diagram of an example of a dispersion-shifted optical fiber's refractive index distribution shape of the background art.

FIGS. 8 and 9 are graphs, like the graph in FIG. 7, representing the distribution of characteristic values associated with changes in Δ2/Δ1 and Δ1 when r2/r1 is 7.0 and 9.0, respectively. In these graphs, the cutoff wavelength (λc) and dispersion slope distribution are also indicated.

That is, the cutoff wavelength distribution is also indicated on the curves for which Δ2/Δ1 is 0.10, 0.12, 0.14, and 0.16. When Δ2/Δ1 is 0.10, for example, the cutoff wavelength is distributed in a range of 1.0 to 1.1. When Δ2/Δ1 is 0.12, on the other hand, the cutoff wavelength is distributed in ranges of 1.1 to 1.2 and 1.2 to 1.3. And, as can be seen, when Δ2/Δ1 is constant, the cutoff wavelength becomes shorter when Δ1 is made large.

The dispersion slope curves have an inverted U shape, distributed in a contoured pattern. The farther to the outside of this contoured pattern distribution, the smaller the dispersion slope, and the closer inside, the larger.

Accordingly, in the graph given in FIG. 8, for example, when Δ2/Δ1 is 0.14, and Δ1 is 1.4 (the point where the Δ2/Δ1=0.14 curve intersects the Δ1=1.4 curve), a dispersion-shifted optical fiber is obtained wherein the cutoff wavelength is in the range of 1300 to 1400 nm, and the dispersion slope is in the range of 0.122 to 0.124 ps/km/nm$^2$.

From the graph given in FIG. 8 it will be seen that, by setting r2/r1 at 5 times or greater, a practicable bending loss is realized in the region where Aeff is 65 $\mu$m$^2$ or greater.

When r2/r1 is large, on the other hand, a larger Aeff can be obtained. However, as may be seen by comparing the graphs given in FIG. 8 and FIG. 9, the dispersion slope tends to become large when r2/r1 is large. In order to obtain dispersion-shifted optical fiber suited to a wavelength division multiplexed system, it is preferable that the dispersion slope in the wavelength band used be 0.14 ps/km/nm$^2$ or less, and, to that end, r2/r1 is made 10 or less.

Accordingly, when provision is made so that r2/r1=x, a range of 5≦x≦10 is desirable.

Also, when Δ2/Δ1 is too small, the bending loss becomes large, becoming practically unusable, wherefore Δ2/Δ1 is made to be 0.08 or larger. If Δ2/Δ1 is too large, on the other hand, the cutoff wavelength becomes long, and single-mode propagation can no longer be secured in the wavelength band used, wherefore Δ2/Δ1 is made to be 0.22 or less.

Accordingly, when provision is made so that Δ2/Δ1=y, a range of 0.08≦y≦0.22 is desirable.

The value of Δ2/Δ1 (y) can also be adjusted according to the bending loss allowed and the cutoff wavelength required in different individual light communication systems.

Δ1 is made to range from 0.6 to 1.2%. When this value is less than 0.6%, bending loss becomes too large, and, in some cases, the chromatic dispersion value cannot be controlled to the desired value. When 1.2% is exceeded, Aeff cannot be sufficiently expanded, and, in some cases, Rayleigh loss becomes large.

The preferable ranges for these factors, namely r2/r1 (x), Δ2/Δ1 (y), and Δ1, are the same in cases where the zero dispersion wavelength is on the short wavelength side from the wavelength band used.

Design is effected so that combinations of structural parameters are selected from these numerical ranges which satisfy the characteristics of the dispersion-shifted optical fiber of this embodiment.

In the dispersion-shifted optical fiber of this embodiment, furthermore, r2, that is, the radius of the core, is not particularly limited, but the range thereof is ordinarily 4 to 12 $\mu$m. And the outer diameter of the clad 7 (i.e. of the dispersion-shifted optical fiber) is ordinarily made approximately 125 $\mu$m.

In the dispersion-shifted optical fiber of this embodiment, moreover, the limits of the structural parameters will differ according as to whether the fiber has the zero dispersion wavelength on the long wavelength side from the wavelength band used, or on the short wavelength side thereof.

When the zero dispersion wavelength is on the long wavelength side from the wavelength band used, the limitations noted below are given.

Specifically, in order to obtain dispersion-shifted optical fiber with an Aeff of 65 to 75 $\mu$m$^2$ and a dispersion slope of 0.125 ps/km/nm$^2$ or less, the conditions noted below should be satisfied.

When r2/r1 is expressed by x and Δ2/Δ1 by y,

6≦x≦7, 0.1≦y≦0.18, y≧(−0.02x+0.24), and 0.6%≦Δ1≦1.2%.

And in order to obtain dispersion-shifted optical fiber with an Aeff of 70 to 80 $\mu$m$^2$ and a dispersion slope of 0.130 ps/km/nm$^2$ or less, the conditions noted below should be satisfied.

7≦x≦8, 0.1≦y≦0.16, y≧(−0.016x+0.21), and 0.6%≦Δ1≦1.2%.

And in order to obtain dispersion-shifted optical fiber with an Aeff of 75 to 85 $\mu$m$^2$ and a dispersion slope of 0.135 ps/km/nm$^2$ or less, the conditions noted below should be satisfied.

7≦x≦8.5, 0.1≦y≦0.16, (−0.02x+0.26)≦y≦(−0.02x+0.32), and 0.6%≦Δ1≦1.2%.

When there is a zero dispersion wavelength on the short wavelength side from the wavelength band used, on the other hand, the limitations noted below are given.

Specifically, in order to obtain dispersion-shifted optical fiber with an Aeff of 65 to 75 $\mu$m$^2$ and a dispersion slope of 0.110 ps/km/nm$^2$ or less, the conditions noted below should be satisfied.

5≦x≦8, 0.12≦y≦0.22, (−0.02x+0.24)≦y≦(−0.02x+0.34), and 0.6%≦Δ1≦1.2%.

Here, when x is large and y is small, even if x (r2/r1) and y (Δ2/Δ1) satisfy the ranges noted, it is necessary to set the value of Δ1 large. As a consequence, there is a possibility that transmission loss will worsen due to the increase in Rayleigh loss.

In order to prevent that from happening, Δ1 is limited. That is, when Δ1 is set within the range noted above, the resulting transmission loss presents no problem in practice. The same reason applies to the limitation on Δ1 noted below.

In order to obtain dispersion-shifted optical fiber with an Aeff of 70 to 80 $\mu$m$^2$ and a dispersion slope of 0.115 ps/km/nm$^2$ or less, the conditions noted below should be satisfied.

$5.5 \leq x \leq 8$, $0.12 < y \leq 0.20$, $(-0.02x+0.25) \leq y \leq (-0.02x+0.33)$, and $0.6\% \leq \Delta1 \leq 1.2\%$.

In order to obtain dispersion-shifted optical fiber with an Aeff of 75 to 85 $\mu m^2$ and a dispersion slope of 0.125 ps/km/nm$^2$ or less, the conditions noted below should be satisfied.

$6 \leq x \leq 8$, $0.12 \leq y \leq 0.20$, $(-0.02x+0.26) \leq y \leq (-0.02x+0.35)$, and $0.6\% \leq \Delta1 \leq 1.2\%$.

It goes without saying that the specific numerical values of r1, r2, Δ1, and Δ2 must be adjusted further, within the ranges noted above, depending on such factors as the wavelength band used and the setting conditions for the zero dispersion wavelength.

In the following, design examples are cited and specifically described.

Tables 8 and 9 give structural parameters and characteristic values for dispersion-shifted optical fibers prototyped with the CVD method, using the smaller diameter solution. In the tables, λc is the cutoff wavelength and MFD is the mode field diameter.

structural parameter conditions noted earlier. A dispersion slope value of 0.125 ps/km/nm$^2$ or less is obtained.

No. 4 to 6 are dispersion-shifted optical fiber design examples having an Aeff in the vicinity of 75 $\mu m^2$. With these, a dispersion slope value of 0.130 ps/km/nm$^2$ or less is obtained.

No. 7 to 9 are dispersion-shifted optical fiber design examples having an Aeff in the vicinity of 80 $\mu m^2$. With these, a dispersion slope value of 0.135 ps/km/nm$^2$ or less is obtained.

No. 10 to 18 in Table 9 are designed such that, at 1550 nm, the chromatic dispersion value is positive, in the vicinity of 2 ps/km/nm, the zero dispersion wavelength is approximately 1540 nm or less, and the zero dispersion wavelength is on the short wavelength side from the wavelength (band) used.

No. 10 to 12 are dispersion-shifted optical fiber design examples having an Aeff in the vicinity of 70 $\mu m^2$. With these, a dispersion slope value of 0.110 ps/km/nm$^2$ or less is obtained.

No. 13 to 15 are dispersion-shifted optical fiber design examples having an Aeff in the vicinity of 75 $\mu m^2$. With these, a dispersion slope value of 0.115 ps/km/nm$^2$ or less is obtained.

No. 16 to 18 are dispersion-shifted optical fiber design examples having an Aeff in the vicinity of 80 With these, a dispersion slope value of 0.125 ps/km/nm$^2$ or less is obtained.

TABLE 8

| NO. | r2/r1 | Δ2/Δ1 | Δ1 [%] | λc [μm] | Aeff [μm²] | MFD [μm] | CHROMATIC DISPERSION [ps/km/nm] | DISPERSION SLOPE [ps/km/nm²] | SENDING LOSS AT 20φ [dB/m] |
|---|---|---|---|---|---|---|---|---|---|
| 1 | 6.0 | 0.12 | 1.10 | 1.10 | 68.8 | 9.35 | −2.1 | 0.116 | 39.3 |
| 2 | 7.0 | 0.16 | 1.10 | 1.57 | 70.6 | 9.43 | −2.3 | 0.124 | 3.0 |
| 3 | 6.5 | 0.14 | 1.00 | 1.34 | 71.4 | 9.51 | −1.7 | 0.120 | 15.8 |
| 4 | 7.0 | 0.14 | 0.95 | 1.44 | 76.5 | 8.85 | −2.2 | 0.122 | 17.5 |
| 5 | 7.0 | 0.16 | 0.85 | 1.63 | 77.0 | 9.89 | −2.1 | 0.117 | 16.6 |
| 6 | 7.5 | 0.11 | 1.10 | 1.32 | 76.0 | 9.71 | −1.8 | 0.128 | 26.8 |
| 7 | 7.5 | 0.15 | 0.70 | 1.60 | 77.7 | 10.01 | −1.9 | 0.105 | 56.5 |
| 8 | 8.0 | 0.12 | 1.20 | 1.40 | 79.6 | 9.90 | −2.0 | 0.131 | 26.4 |
| 9 | 8.5 | 0.12 | 1.20 | 1.48 | 83.3 | 10.08 | −2.3 | 0.133 | 26.7 |

\* All characteristic values are values for 1550 nm

TABLE 9

| NO. | r2/r1 | Δ2/Δ1 | Δ1 [%] | λc [μm] | Aeff [μm²] | MFD [μm] | CHROMATIC DISPERSION [ps/km/nm] | DISPERSION SLOPE [ps/km/nm²] | BENDING LOSS AT 20φ [dB/m] |
|---|---|---|---|---|---|---|---|---|---|
| 10 | 5.0 | 0.18 | 0.80 | 1.26 | 71.3 | 9.65 | 2.2 | 0.099 | 14.7 |
| 11 | 6.0 | 0.16 | 1.10 | 1.24 | 71.1 | 9.54 | 2.1 | 0.104 | 10.6 |
| 12 | 6.5 | 0.17 | 1.20 | 1.39 | 69.9 | 9.43 | 1.8 | 0.107 | 2.3 |
| 13 | 6.0 | 0.18 | 0.90 | 1.44 | 76.8 | 9.92 | 2.3 | 0.106 | 8.7 |
| 14 | 6.0 | 0.14 | 1.10 | 1.12 | 74.9 | 9.79 | 2.1 | 0.102 | 44.5 |
| 15 | 7.0 | 0.16 | 1.20 | 1.43 | 75.2 | 9.74 | 1.9 | 0.111 | 4.4 |
| 16 | 6.0 | 0.18 | 0.80 | 1.47 | 81.1 | 10.20 | 2.4 | 0.105 | 17.4 |
| 17 | 7.0 | 0.14 | 1.15 | 1.30 | 80.0 | 10.03 | 2.0 | 0.110 | 23.4 |
| 18 | 7.5 | 0.16 | 1.10 | 1.56 | 83.5 | 10.20 | 2.1 | 0.115 | 8.1 |

\* All characteristic values are values for 1550 nm

The dispersion-shifted optical fibers numbered 1 to 9 in Table 8 are designed such that, at 1550 nm, the chromatic dispersion value is negative, in the vicinity of −2 ps/km/nm, with the zero dispersion wavelength approximately 1565 nm or greater, and the zero dispersion wavelength on the long wavelength side from the wavelength band used.

No. 1 to 3 are dispersion-shifted optical fiber design examples having an Aeff in the vicinity of 70 $\mu m^2$. All of these dispersion-shifted optical fibers satisfy the preferred In this embodiment, the chromatic dispersion value for the wavelength band used is controlled within a certain range, never becoming zero, and the Aeff is expanded. Therefore nonlinear optical effects are not readily produced, making it possible to provide dispersion-shifted optical fiber suitable for long haul systems such as light amplifying relay transmission systems wherein optical fiber amplifiers are used. The dispersion slope is controlled so as to be small, moreover, and application in wavelength division multiplexed transmission is possible.

Because the chromatic dispersion value can be adjusted to either a positive or negative value, moreover, the sign of the chromatic dispersion value can be set according to the light communication system.

INDUSTRIAL APPLICABILITY

Based on the present invention, a dispersion-shifted optical fiber is obtained wherewith, under conditions such that the dispersion-shifted optical fiber is substantially single mode, and such that bending loss is held down to 100 dB/m or lower, both Aeff expansion and dispersion slope reduction can be satisfactorily effected.

The structure of the dispersion-shifted optical fibers of the present invention is simple, furthermore, wherefore dispersion-shifted optical fiber that exhibits stable characteristics can be efficiently manufactured.

What is claimed is:

1. A dispersion-shifted optical fiber hang a refractive index distribution shape, comprising a center core portion of high refractive index, a step core portion of lower refractive index than said center core portion, provided about outer circumference thereof; and clad of lower refractive index than said step core portion, provided about outer circumference of the step core portion;

wherein the dispersion-shifted optical fiber has, in a used wavelength band selected from 1490 to 1625 nm, Aeff of 45 to 90 $\mu m^2$, dispersion slope of from 0.05 to 0.14 ps/km/nm$^2$, bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein larger diameter solution is adopted for core diameter, and said dispersion-shifted optical fiber has, in a used wavelength band selected from 1490 to 1625 nm, Aeff of 45 to 70 $\mu m^2$, dispersion slope of from 0.05 to 0.08 ps/km/nm$^2$, bending loss of 100 dB/m or less, and chromatic dispersion value of from −0.5 to −8.0 ps/km/nm, and has a cutoff wavelength such that substantially single-mode propagation is realized; and wherein when radius of said center core portion is represented as r1, radius of said step core portion as r2, relative refractive-index difference of said center core portion when refractive index of outermost clad is taken as reference as Δ1, and relative refractive-index difference of said step core portion as Δ2, r2/r1 is from 4 to 12, Δ2/Δ1 is from 0.05 to 0.15, and Δ1 is from 0.55 to 0.85%.

2. A dispersion-shifted optical fiber having a refractive index distribution shape, comprising a center core portion of high refractive index, a step core portion of lower refractive index than said center core portion, provided about outer circumference thereof; and clad of lower refractive index than said step core portion, provided about outer circumference of the step core portion;

wherein the dispersion-shifted optical fiber has, in a used wavelength band selected from 1490 to 1625 nm, Aeff of 45 to 90 $\mu m^2$, dispersion slope of from 0.05 to 0.14 ps/km/nm$^2$, bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein larger diameter solution is adopted for core diameter, and said dispersion-shifted optical fiber has, in a used wavelength band selected from 1490 to 1625 nm, Aeff of 45 to 70 $\mu m^2$, dispersion slope of from 0.05 to 0.08 ps/km/nm$^2$, bending loss of 100 dB/m or less, and chromatic dispersion value of from −0.5 to −8.0 ps/km/nm, and has a cutoff wavelength such that substantially single-mode propagation is realized; and wherein said clad comprises first clad provided about outer circumference of said step core portion and second clad having a higher refractive index than said first clad, provided about outer circumference of the first clad.

3. The dispersion-shifted optical fiber according to claim 2, wherein when radius of said center core portion is represented as r1, radius of said step core portion as r2, radius of the first clad as r3, relative refractive-index difference of said center core portion when refractive index of said outermost clad is taken as reference as Δ1, relative refractive-index difference of said step core portion as Δ2, and relative refractive-index difference of said first clad as Δ3, r2/r1 is from 4 to 12, Δ2/Δ1 is from 0.05 to 0.15, Δ1 is from 0.55 to 0.85%, Δ3 is from −0.3 to 0%, and (r3−r2)/r1 is from 0.2 to 4.0.

4. A dispersion-shifted optical fiber having a refractive index distribution shape, comprising a center core portion of high refractive index, a step core portion of lower refractive index than said center core portion, provided about outer circumference thereof; and clad of lower refractive index than said step core portion, provided about outer circumference of the step core portion;

wherein the dispersion-shifted optical fiber has, in a used wavelength band selected from 1490 to 1625 nm, Aeff of 45 to 90 $\mu m^2$, dispersion slope of from 0.05 to 0.14 ps/km/nm$^2$, bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein larger diameter solution is adopted for core diameter, said dispersion-shifted optical fiber has, in a used wavelength band selected from 1490 to 1625 nm, Aeff of 45 to 70 $\mu m^2$, dispersion slope of from 0.05 to 0.075 ps/km/nm$^2$; bending loss of 100 dB/m or less, and chromatic dispersion value of from +0.05 to +10.0 ps/km/nm, and has a cutoff wavelength such that substantially single-mode propagation is realized; and wherein, when radius of said center core portion is represented as r1, radius of said step core portion as r2, relative refractive-index difference of said center core portion when refractive index of said outermost clad is taken as reference as Δ1, and relative refractive-index difference of said step core portion as Δ2, r2/r1 is from 4 to 12, Δ1 is from 0.55 to 0.75%, and Δ2/Δ1 is from 0.05 to 0.15.

5. The dispersion-shifted optical fiber according to claim 4, wherein said clad comprises first clad provided about outer circumference of said step core portion and second clad provided about outer circumference thereof.

6. The dispersion-shifted optical fiber according to claim 4, wherein when radius of said center core portion is represented as r1, radius of said step core portion as r2, radius of said first clad as r3, relative refractive-index difference of said center core portion when refractive index of said second clad is taken as reference as Δ1, relative refractive-index difference of said step core portion as Δ2, and relative refractive-index difference of said first clad as Δ3, r2/r1 is from 4 to 12, Δ1 is from 0.55 to 0.75%, Δ2/Δ1 is from 0.05 to 0.15, Δ3 is from −0.1 to 0%, and (r3−r2)/r1 is from 0.2 to 4.0.

7. A dispersion-shifted optical fiber having a refractive index distribution shape, comprising a center core portion of high refractive index, a step core portion of lower refractive index than said center core portion, provided about outer circumference thereof; and clad of lower refractive index than said step core portion, provided about outer circumference of the step core portion;

wherein the dispersion-shifted optical fiber has, in a used wavelength band selected from 1490 to 1625 nm, Aeff of 45 to 90 $\mu m^2$, dispersion slope of from 0.05 to 0.14 ps/km/nm$^2$, bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein smaller diameter solution is adopted for said core diameter, said dispersion-shifted optical fiber has, in a used wavelength band selected from 1490 to 1625 nm, Aeff of 65 to 95 $\mu m^2$, dispersion slope of from 0.08 to 0.14 ps/km/nm$^2$, bending loss of 100 dB/m or less, and absolute values of chromatic dispersion value of from 0.5 to 8.0 ps/km/nm, and has a cutoff wavelength such that substantially single-mode propagation is realized; and wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $5 \leq x \leq 10$, $0.08 \leq y \leq 0.22$, and $0.6\% < \Delta 1 < 1.2\%$.

8. A dispersion-shifted optical fiber having a refractive index distribution shape, comprising a center core portion of high refractive index, a step core portion of lower refractive index than said center core portion, provided about outer circumference thereof, and clad of lower refractive index than said step core portion, provided about outer circumference of the step core portion;

wherein the dispersion-shifted optical fiber has, in a used wavelength band selected from 1490 to 1625 nm, Aeff of 45 to 90 $\mu m^2$, dispersion slope of from 0.05 to 0.14 ps/km/nm$^2$, bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein smaller diameter solution is adopted for said core diameter, said dispersion-shifted optical fiber has, in a used wavelength band selected from 1490 to 1625 nm, Aeff of 65 to 95 $\mu m^2$, dispersion slope of from 0.08 to 0.14 ps/km/nm$^2$, bending loss of 100 dB/m or less, and absolute values of chromatic dispersion value of from 0.5 to 8.0 ps/km/nm, and has a cutoff wavelength such that substantially single-mode propagation is realized; and having a zero dispersion wavelength on the side of longer wavelengths than the wavelength band used.

9. The dispersion-shifted optical fiber according to claim 8, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $6 \leq x \leq 7$, $0.1 \leq y \leq 0.18$, $y \geq (-0.02x+0.24)$, $0.6\% \leq \Delta 1 \leq 1.2\%$, Aeff is from 65 to 75 $\mu m^2$, and dispersion slope is 0.125 ps/km/nm$^2$ or less.

10. The dispersion-shifted optical fiber according to claim 8, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $7 \leq x \leq 8$, $0.1 \leq y \leq 0.16$, $y \geq (-0.016x+0.21)$, $0.6\% \leq \Delta 1 \leq 1.2\%$, Aeff is from 70 to 80 $\mu m^2$, and dispersion slope is 0.130 ps/km/nm$^2$ or less.

11. The dispersion-shifted optical fiber according to claim 8, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $7 \leq x \leq 8.5$, $0.1 \leq y \leq 0.16$, $(-0.02x+0.26) \leq y \leq (-0.02x+0.32)$, $0.6\% \leq \Delta 1 \leq 1.2\%$, Aeff is from 75 to 85 $\mu m^2$, and dispersion slope is 0.135 ps/km/nm$^2$ or less.

12. A dispersion-shifted optical fiber having a refractive index distribution shape, comprising a center core portion of high refractive index, a step core portion of lower refractive index than said center core portion, provided about outer circumference thereof; and clad of lower refractive index than said step core portion, provided about outer circumference of the step core portion;

wherein the dispersion-shifted optical fiber has, in a used wavelength band selected from 1490 to 1625 rim, Aeff of 45 to 90 $\mu m^2$, dispersion slope of from 0.05 to 0.14 ps/km/nm$^2$ bending loss of 100 dB/m or less, and chromatic dispersion value of either from −0.5 to −8.0 ps/km/nm or from +0.05 to +10.0 ps/km/nm, and has a cutoff wavelength such that substantially single-mode propagation is realized;

wherein smaller diameter solution is adopted for said core diameter, said dispersion-shifted optical fiber has, in a used wavelength band selected from 1490 to 1625 nm, Aeff of 65 to 95 $\mu m^2$, dispersion slope of from 0.08 to 0.14 ps/km/nm$^2$, bending loss of 100 dB/m or less, and absolute values of chromatic dispersion value of from 0.5 to 8.0 ps/km/nm, and has a cutoff wavelength such that substantially single-mode propagation is realized; and having a zero dispersion on the side of shorter wavelength than the wavelength band used.

13. The dispersion-shifted optical fiber according to claim 12, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $5 \leq x \leq 8$, $0.12 \leq y \leq 0.22$, $(-0.02x+0.24) \leq y \leq (-0.02x+0.34)$, $0.6\% \leq \Delta 1 \leq 1.2\%$, Aeff is from 65 to 75 $\mu m^2$, and dispersion slope is 0.110 ps/km/nm$^2$ or less.

14. The dispersion-shifted optical fiber according to claim 12, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $5.5 \leq x \leq 8$, $0.12 \leq y \leq 0.20$, $(-0.02x+0.25) \leq y \leq (-0.02x+0.33)$, $0.6\% \leq \Delta 1 \leq 1.2\%$, Aeff is from 70 to 80 $\mu m^2$, and dispersion slope is 0.115 ps/km/nm² or less.

15. The dispersion-shifted optical fiber according to claim 12, wherein, when radius of said center core portion is represented as r1, radius of said step core portion as r2, relative refractive-index difference of said center core portion when refractive index of said clad is taken as reference as Δ1, relative refractive-index difference of said step core portion as Δ2, r2/r1 as x, and Δ2/Δ1 as y, $6 \leq x \leq 8$, $0.12 \leq y \leq 0.20$, $(-0.02x+0.26) \leq y \leq (-0.02x+0.35)$, $0.6\% \leq \Delta 1 \leq 1.2\%$, Aeff is from 75 to 85 $\mu m^2$, and dispersion slope is 0.125 ps/km/nm² or less.

* * * * *